United States Patent
Radtke et al.

(10) Patent No.: US 12,520,747 B2
(45) Date of Patent: Jan. 13, 2026

(54) TRENCH CLOSING ASSEMBLY

(71) Applicant: Precision Planting LLC, Tremont, IL (US)

(72) Inventors: Ian Radtke, Washington, IL (US); Jason Stoller, Eureka, IL (US)

(73) Assignee: Precision Planting LLC, Tremont, IL (US)

( * ) Notice: Subject to any disclaimer, the term of this patent is extended or adjusted under 35 U.S.C. 154(b) by 975 days.

(21) Appl. No.: 17/448,484

(22) Filed: Sep. 22, 2021

(65) Prior Publication Data

US 2022/0000011 A1 Jan. 6, 2022

Related U.S. Application Data

(63) Continuation of application No. PCT/IB2020/052424, filed on Mar. 17, 2020.

(60) Provisional application No. 62/967,293, filed on Jan. 29, 2020, provisional application No. 62/831,338, filed on Apr. 9, 2019.

(51) Int. Cl.
*A01C 5/06* (2006.01)
*A01C 23/02* (2006.01)
*A01C 7/06* (2006.01)

(52) U.S. Cl.
CPC ............ *A01C 23/023* (2013.01); *A01C 5/064* (2013.01); *A01C 5/066* (2013.01); *A01C 5/068* (2013.01); *A01C 7/06* (2013.01)

(58) Field of Classification Search
CPC ......... A01C 5/066; A01C 5/068; A01B 15/16; A01B 23/06
See application file for complete search history.

(56) References Cited

U.S. PATENT DOCUMENTS

| | | | | |
|---|---|---|---|---|
| 322,841 | A | * | 7/1885 | Miskimen ................. A01C 5/06 111/194 |
| 4,878,443 | A | * | 11/1989 | Gardner .................. A01C 5/064 172/538 |
| 5,027,724 | A | | 7/1991 | Ptacek et al. |
| 5,507,351 | A | | 4/1996 | Martin |
| 5,562,054 | A | * | 10/1996 | Ryan ....................... A01C 5/062 111/194 |
| 5,590,611 | A | | 1/1997 | Smith |
| 5,626,196 | A | | 5/1997 | Hughes |
| 5,724,902 | A | | 3/1998 | Janelle et al. |

(Continued)

FOREIGN PATENT DOCUMENTS

| | | | | |
|---|---|---|---|---|
| CA | 2690360 A1 | * | 7/2011 | ............... A01C 5/06 |
| CN | 202153838 U | | 3/2012 | |

(Continued)

OTHER PUBLICATIONS

UK Intellectual Property Office, Search Report for related UK Application No. GB1905936.9, dated Oct. 14, 2019.

(Continued)

*Primary Examiner* — Alicia Torres

(57) ABSTRACT

A trench closing system having a frame configured to connect to an agricultural row unit, closing wheels attached to the frame and configured to close an open seed trench opened by an opening system on the agricultural row unit, and a guard mounted to the trench closing system to prevent rocks, rootballs, or other trash from approaching the closing wheels.

19 Claims, 28 Drawing Sheets

(56) References Cited

U.S. PATENT DOCUMENTS

| | | | |
|---|---|---|---|
| 6,006,684 A | 12/1999 | Whalen et al. | |
| 7,191,715 B2* | 3/2007 | Wendte | A01C 5/068 |
| | | | 111/900 |
| 7,213,523 B2 | 5/2007 | Neudorf et al. | |
| 7,322,302 B1 | 1/2008 | Reidhar | |
| 8,561,472 B2 | 10/2013 | Sauder et al. | |
| 9,148,989 B2* | 10/2015 | Van Buskirk | A01C 5/066 |
| 9,173,339 B2 | 11/2015 | Sauder et al. | |
| 9,232,689 B2 | 1/2016 | Trevino et al. | |
| 9,872,423 B2* | 1/2018 | Anderson | A01C 5/068 |
| 10,959,369 B2* | 3/2021 | Sieling | A01C 7/201 |
| 2004/0149188 A1 | 8/2004 | Schneider | |
| 2005/0051068 A1 | 3/2005 | Swanson | |
| 2009/0084295 A1 | 4/2009 | Schaffert | |
| 2012/0048159 A1 | 3/2012 | Adams et al. | |
| 2013/0206431 A1 | 8/2013 | Freed | |
| 2014/0026792 A1 | 1/2014 | Bassett | |
| 2014/0034344 A1 | 2/2014 | Bassett | |
| 2014/0090585 A1 | 4/2014 | Sauder et al. | |
| 2014/0224513 A1 | 8/2014 | Van Buskirk et al. | |
| 2014/0230704 A1 | 8/2014 | Zimmerman | |
| 2014/0251192 A1 | 9/2014 | Dietrich | |
| 2015/0271986 A1 | 10/2015 | Sauder et al. | |
| 2017/0000014 A1 | 1/2017 | Anderson et al. | |
| 2017/0000021 A1 | 1/2017 | Schaffert et al. | |
| 2017/0034993 A1 | 2/2017 | Andrews et al. | |
| 2017/0367250 A1 | 12/2017 | Hagny et al. | |
| 2018/0263174 A1 | 9/2018 | Hodel et al. | |
| 2018/0317380 A1 | 11/2018 | Bassett | |
| 2019/0075714 A1 | 3/2019 | Koch et al. | |
| 2019/0297769 A1* | 10/2019 | Zielke | A01B 63/008 |

FOREIGN PATENT DOCUMENTS

| | | |
|---|---|---|
| DE | 10 2008 027064 A1 | 12/2009 |
| WO | 2013/120202 A1 | 8/2013 |
| WO | 2014/186810 A1 | 11/2014 |
| WO | 2016/048167 A1 | 3/2016 |
| WO | 2017/197274 A1 | 11/2017 |
| WO | 2019/040414 A1 | 2/2019 |
| WO | 2019/169369 A1 | 9/2019 |
| WO | 2020/225623 A1 | 11/2020 |

OTHER PUBLICATIONS

European Patent Office, International Search Report for related International Patent Application No. PCT/IB2020/052424, mail date May 26, 2020.

* cited by examiner

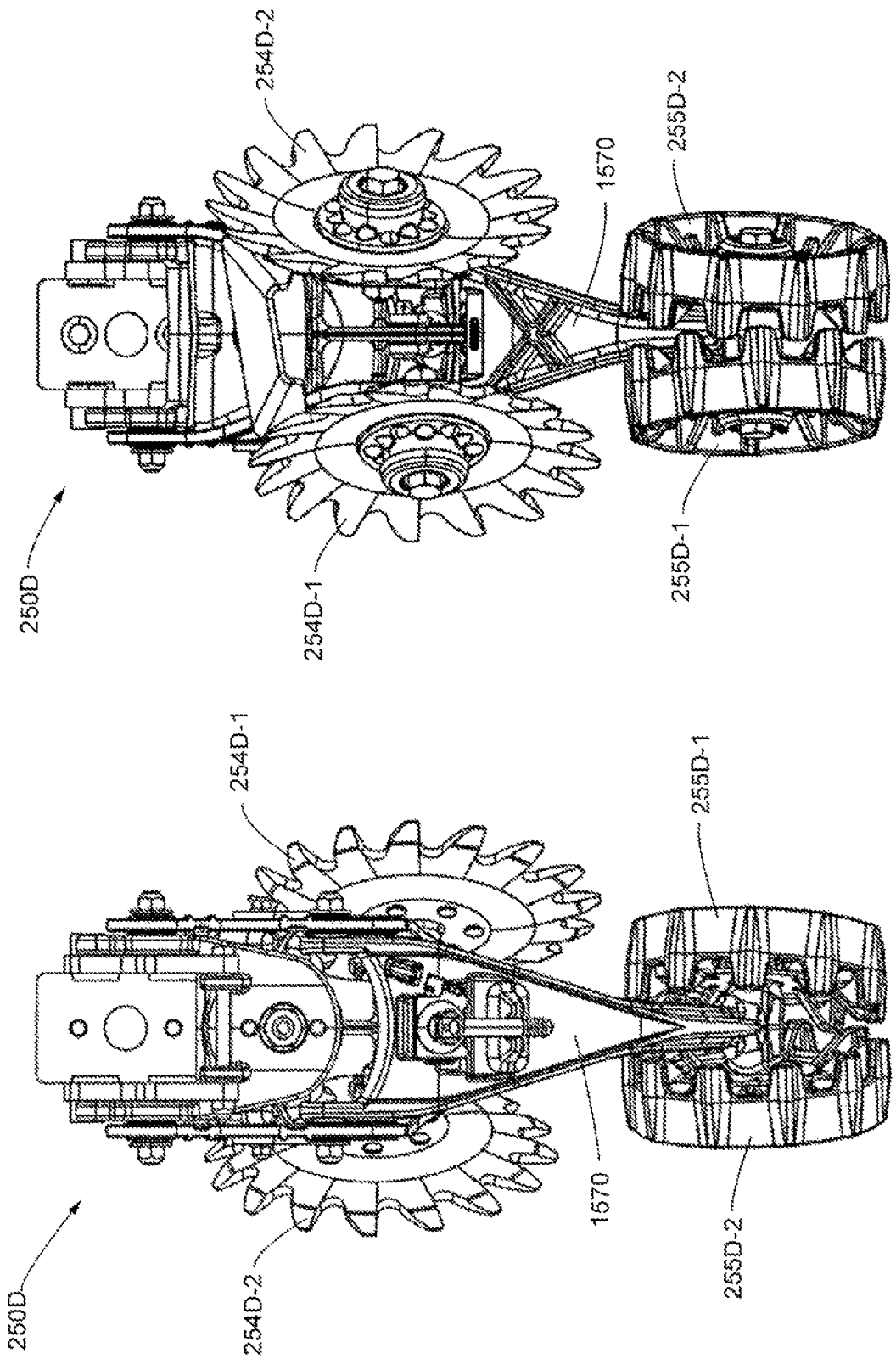

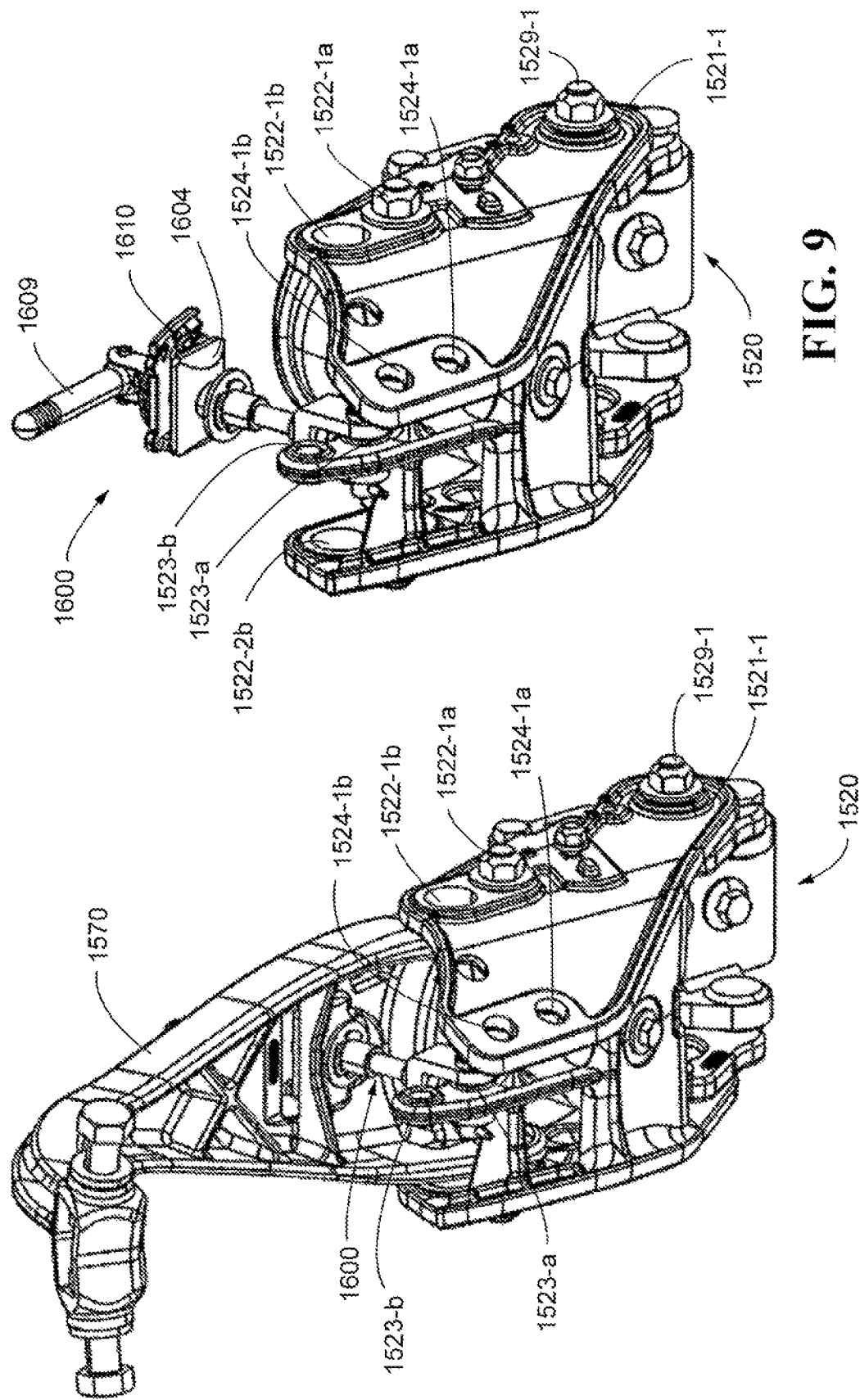

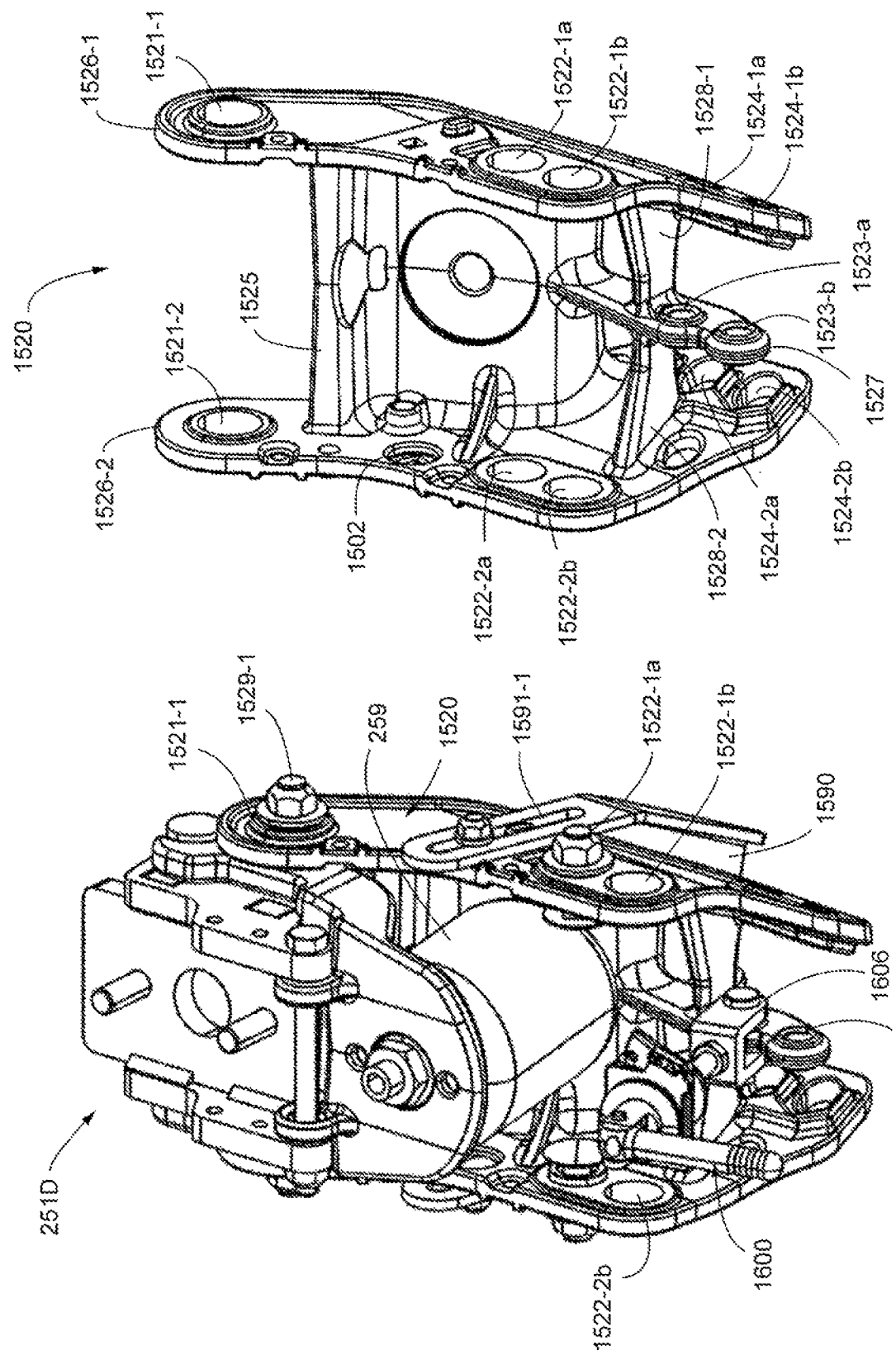

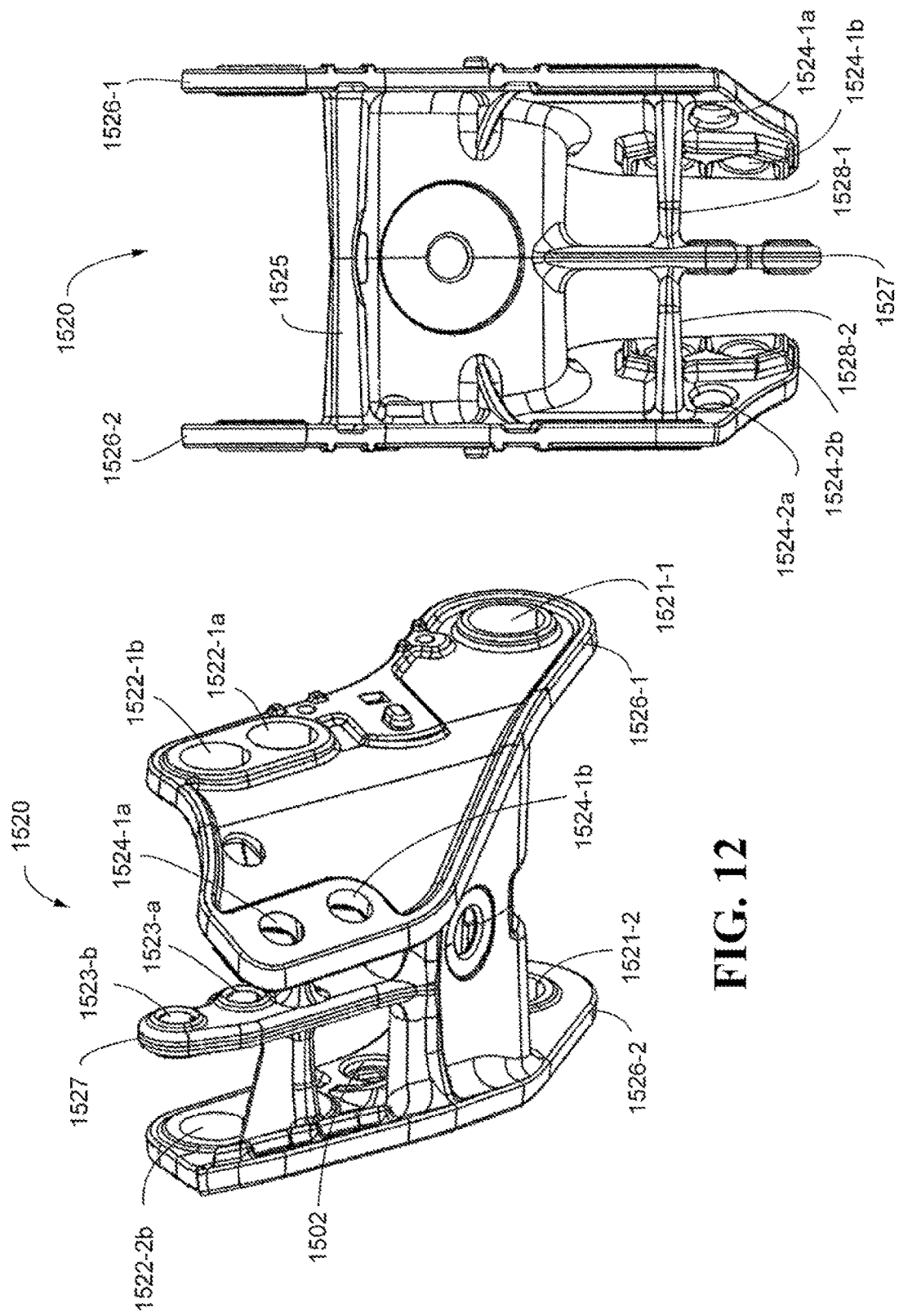

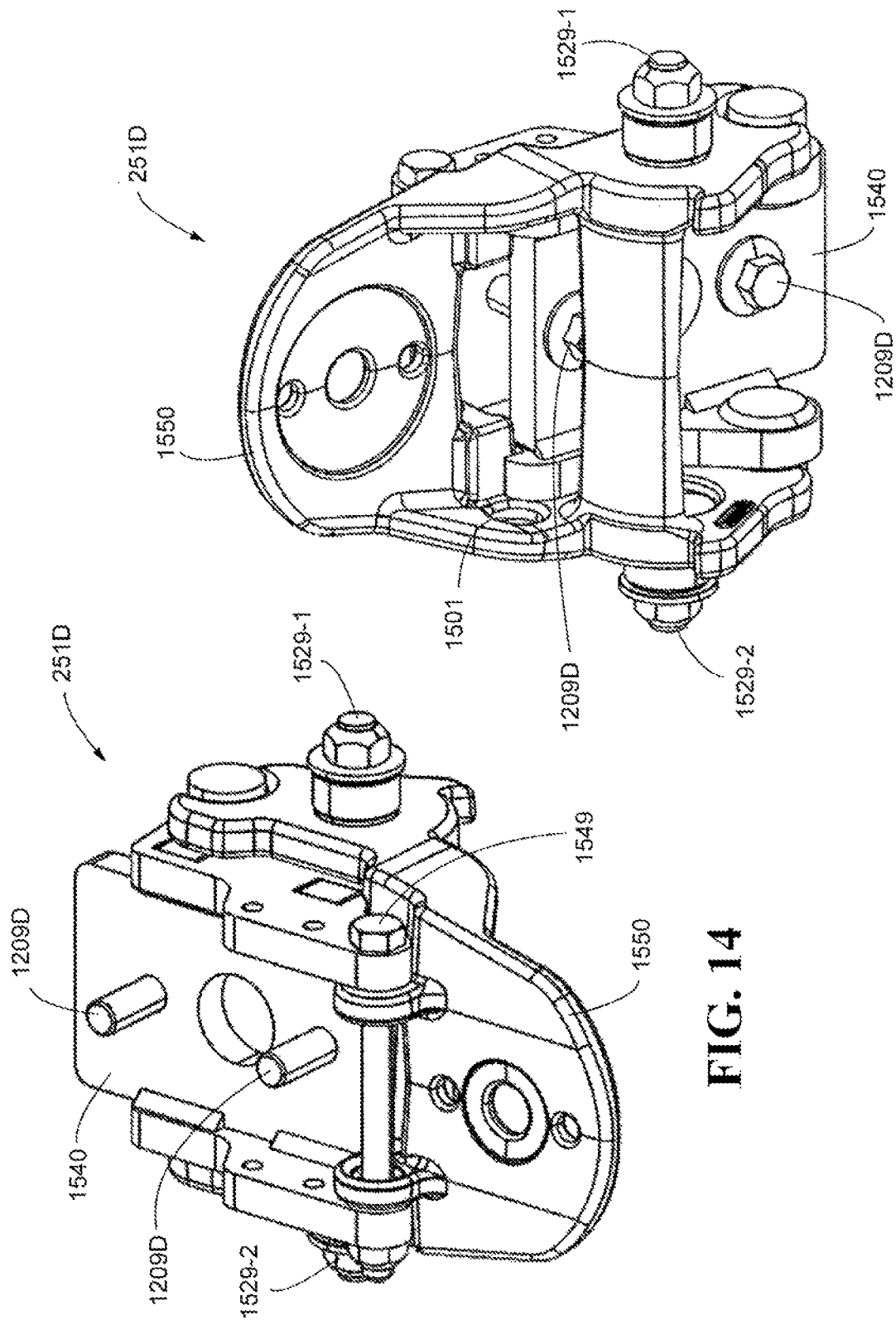

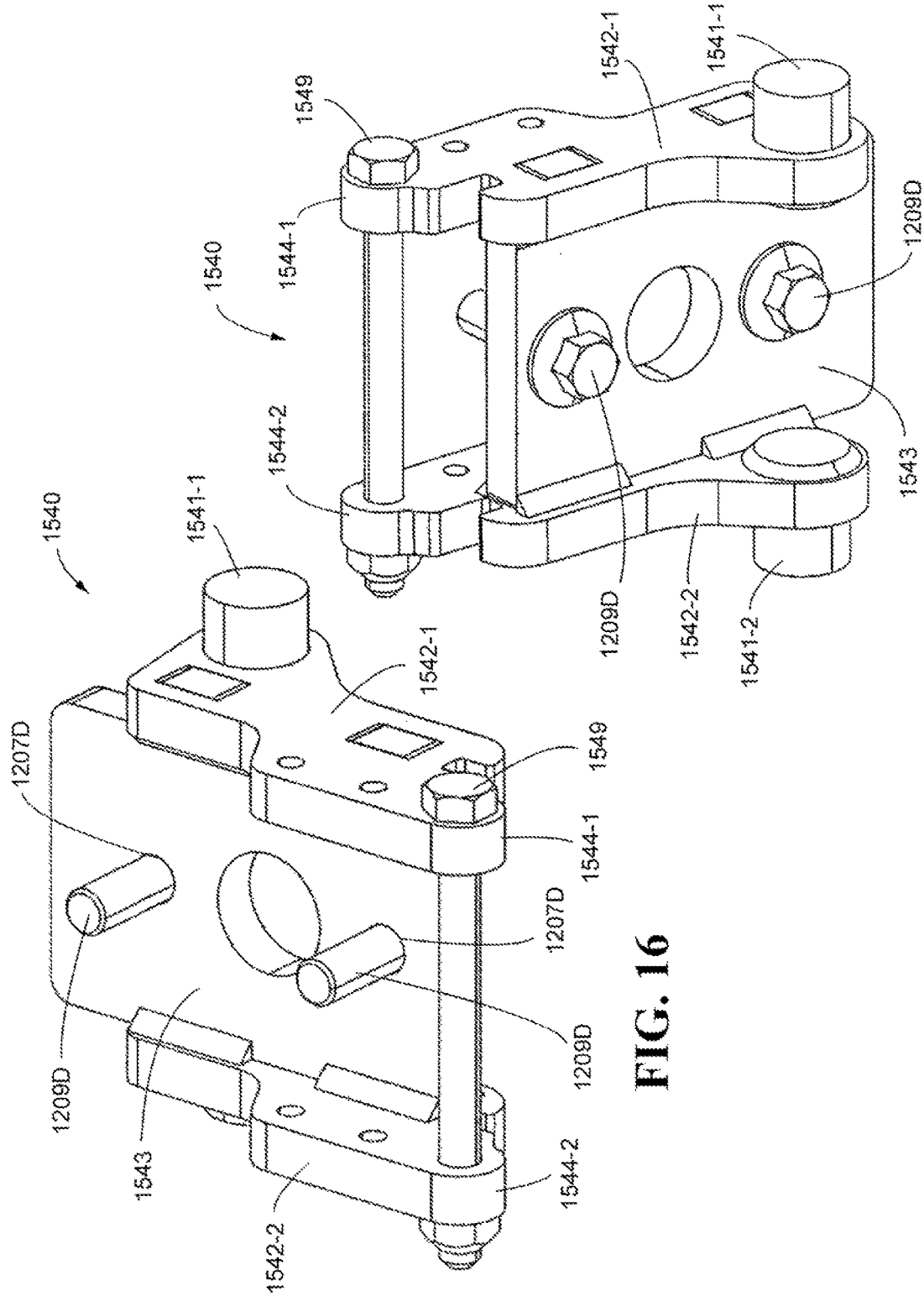

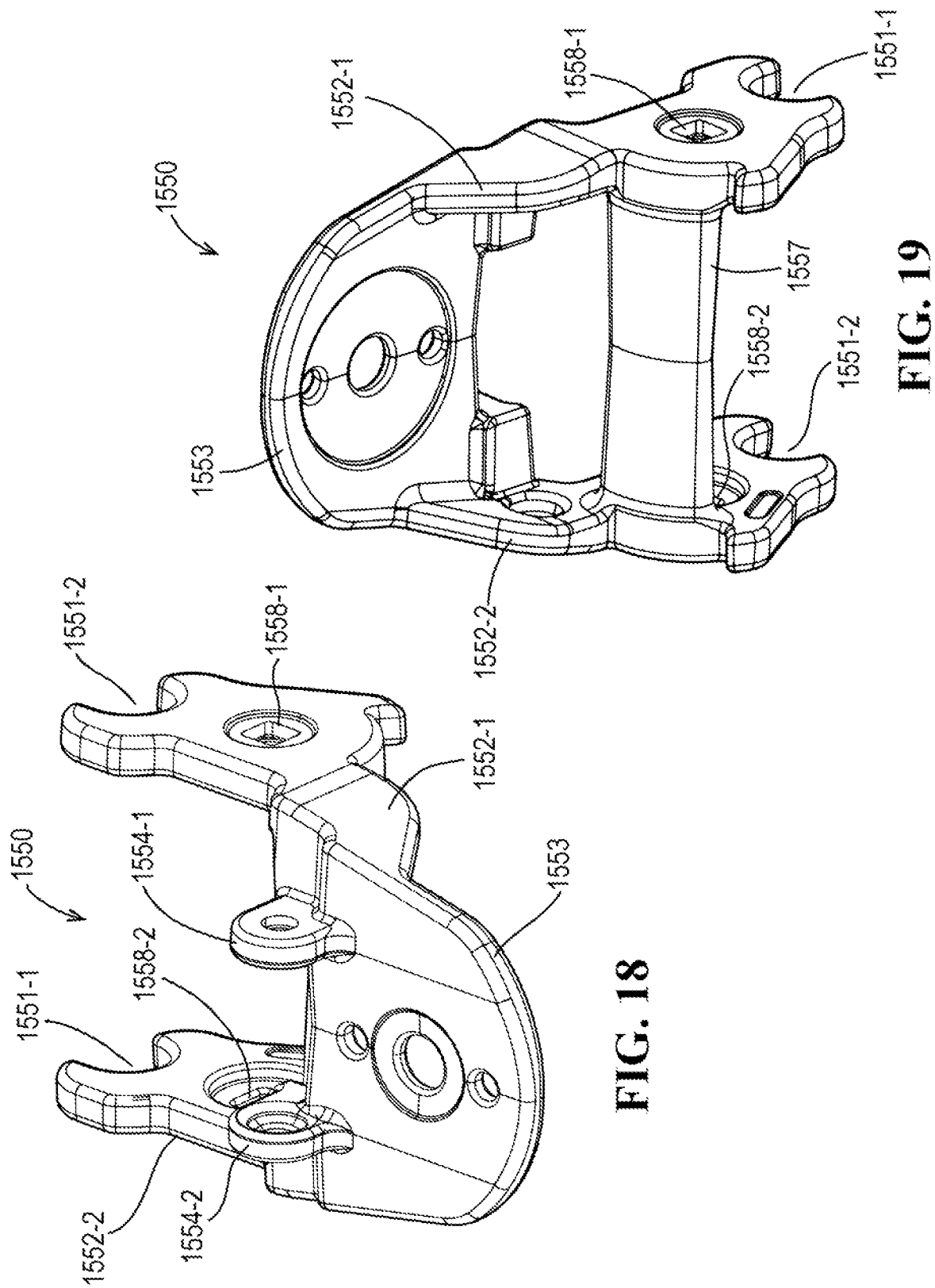

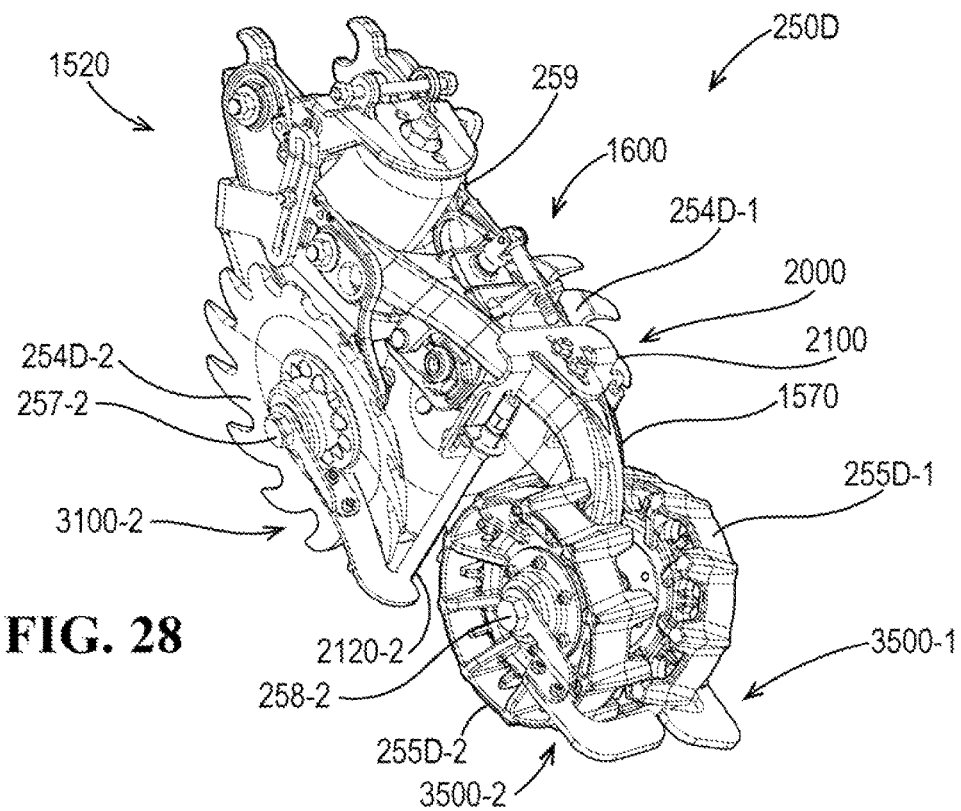
FIG. 28
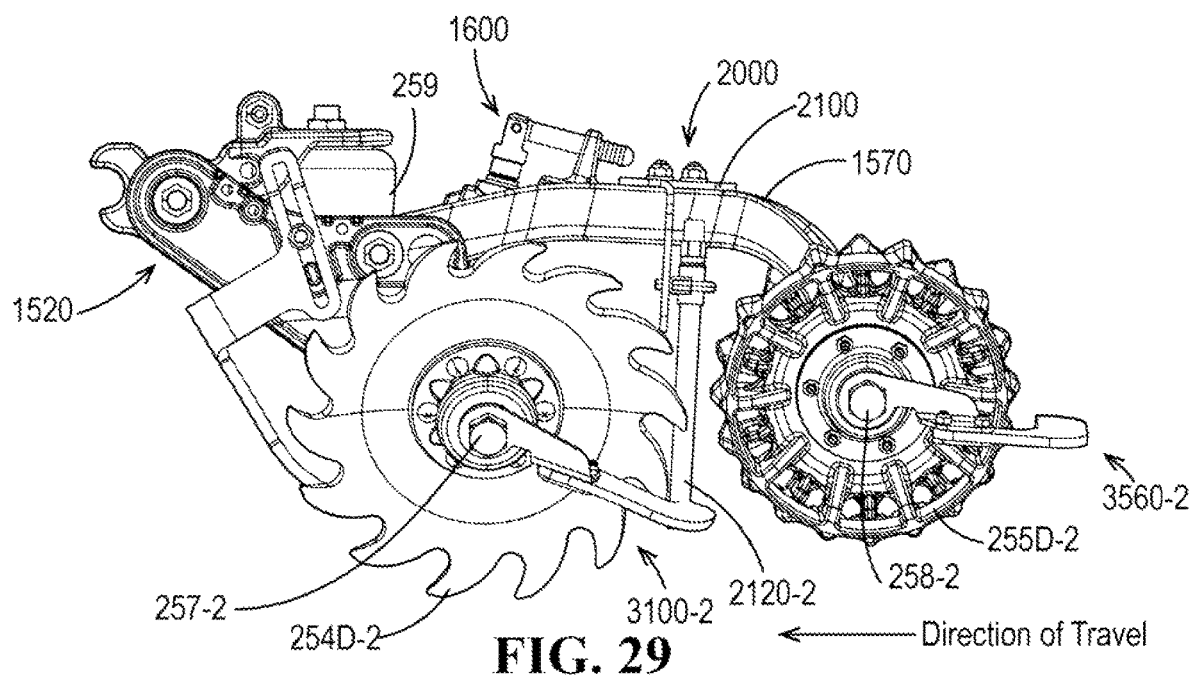
FIG. 29 ← Direction of Travel

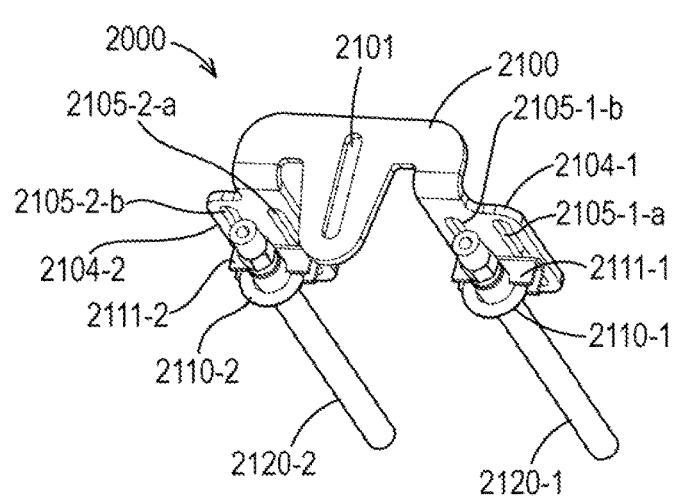
FIG. 37
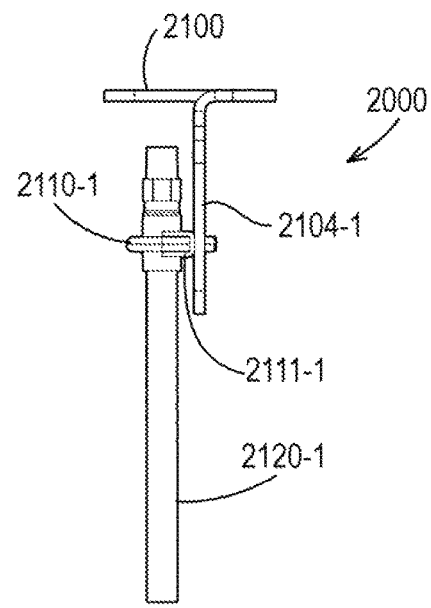
FIG. 38
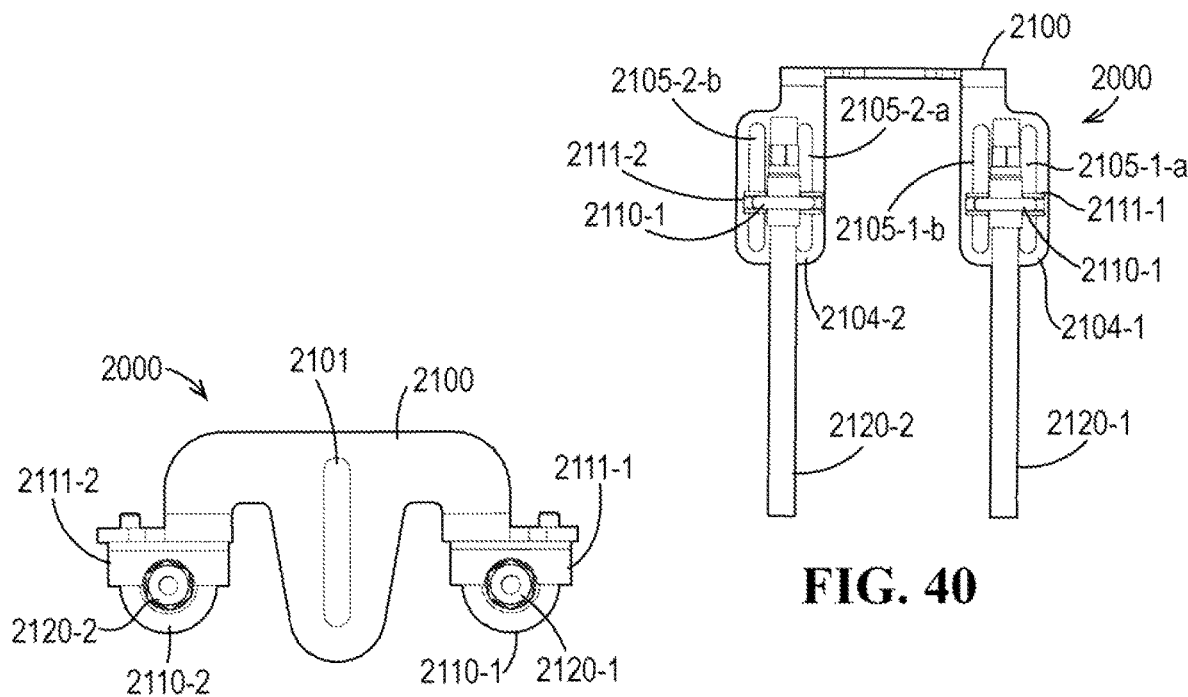
FIG. 39
FIG. 40

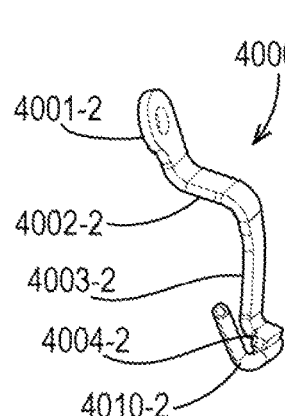
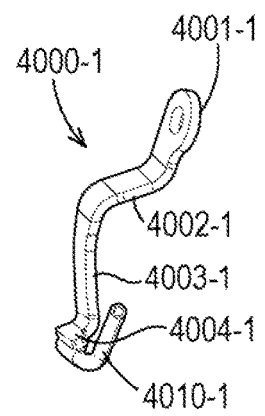
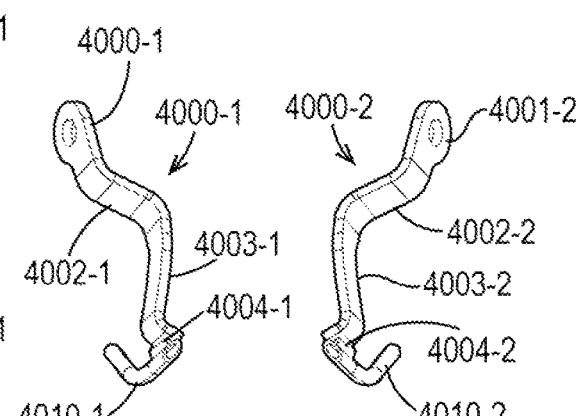
FIG. 45A     FIG. 45B
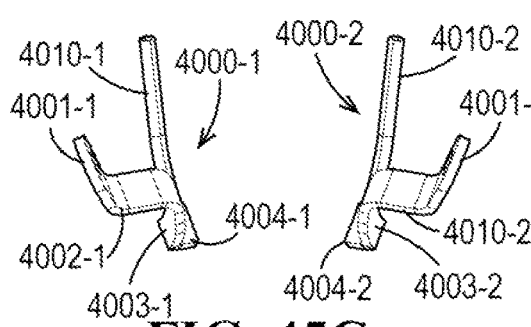
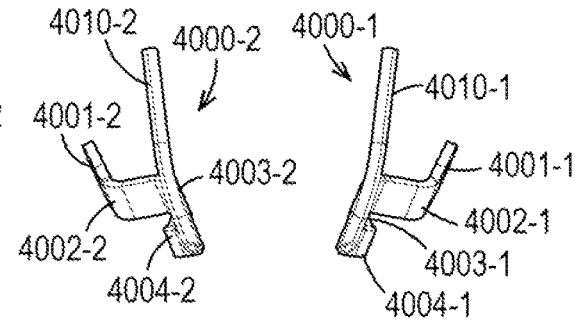
FIG. 45C     FIG. 45D
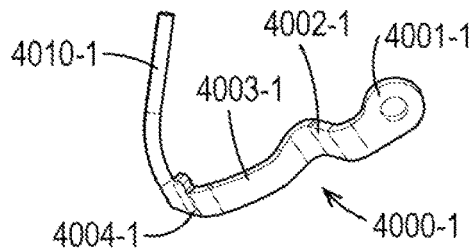
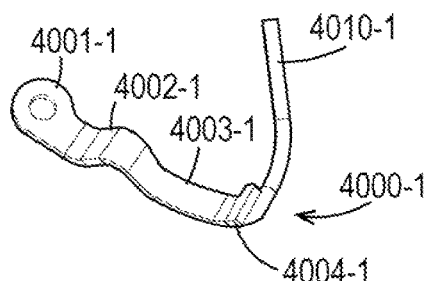
FIG. 46A     FIG. 46B
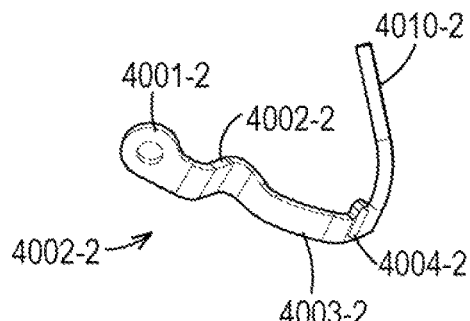
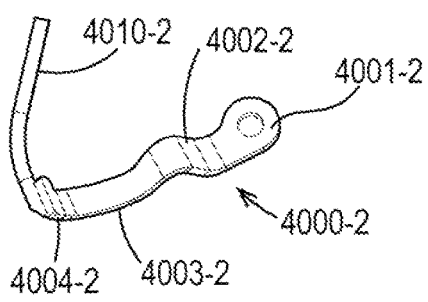
FIG. 47A     FIG. 47B

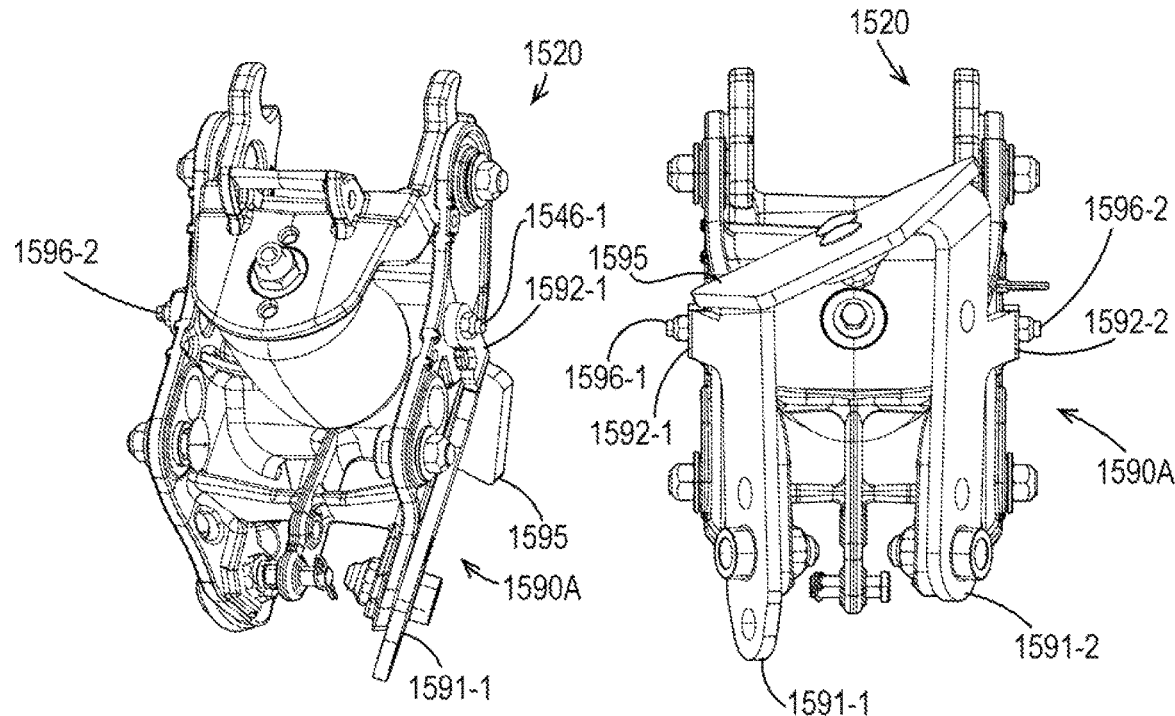
FIG. 48A FIG. 48B
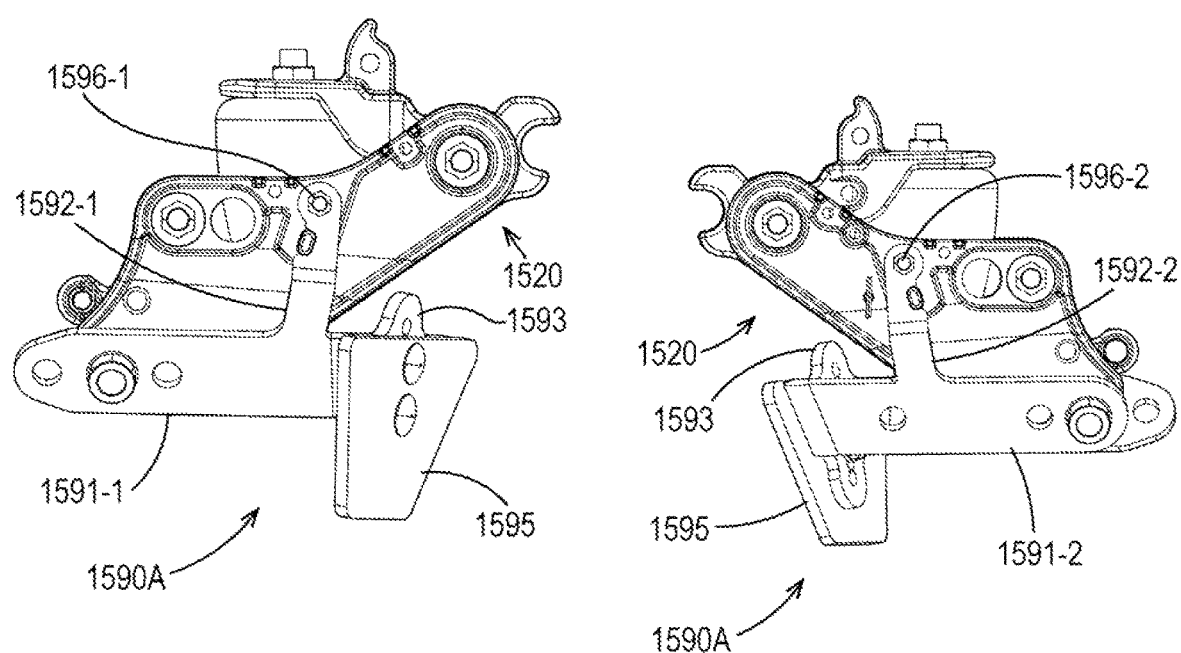
FIG. 48C FIG. 48D

TRENCH CLOSING ASSEMBLY

CROSS-REFERENCE TO RELATED APPLICATIONS

The present application is a continuation application of PCT Application No. PCT/IB2020/052424, filed Mar. 17, 2020, which claims the benefit of priority to U.S. Provisional Patent Application No. 62/831,338 filed Apr. 9, 2019, and U.S. Provisional Patent Application No. 62/967,293 filed Jan. 29, 2020. The entireties of all the foregoing listed applications are incorporated herein by reference.

BACKGROUND

It is well known that good seed-to-soil contact within the seed trench is a critical factor in uniform seed emergence and high yields. To obtain good seed-to-soil contact, once seeds are planted in a seed trench, the seed trench needs to be closed so that soil surrounds the seed.

BRIEF DESCRIPTION OF THE DRAWINGS

FIG. 4 is a top plan view of the trench closing assembly of FIG. 3.

FIG. 5 is a bottom plan view of the trench closing assembly of FIG. 3.

FIG. 8 is a bottom perspective view of the trench closing assembly of FIG. 7 with some parts removed.

FIG. 9 is a bottom perspective view of the trench closing assembly of FIG. 8 with some parts removed.

FIG. 10 is a top perspective view of the trench closing assembly of FIG. 9.

FIG. 11 is a top perspective view of the frame of the trench closing assembly of FIG. 3.

FIG. 12 is a bottom perspective view of the frame of FIG. 11.

FIG. 13 is bottom plan view of the frame of FIG. 11.

FIG. 14 is top perspective view of the frame of the trench closing assembly of FIG. 3.

FIG. 15 is a bottom perspective view of the frame of FIG. 14.

FIG. 16 is a top perspective view of the connection bracket of the frame of FIG. 14.

FIG. 17 is a bottom perspective view of the connection bracket of FIG. 16.

FIG. 18 is a top perspective view of the attachment bracket of the frame of FIG. 14.

FIG. 19 is a bottom perspective view of the attachment bracket of FIG. 15.

FIG. 28 is a perspective view of the trench closing assembly of FIG. 3 further including soil deflectors and a fluid applicator according to an embodiment.

FIG. 29 is a left side elevation view of the trench closing assembly of FIG. 28.

FIG. 37 is a perspective view of the fluid applicator according to an embodiment.

FIG. 38 is a right side elevation view of the fluid applicator of FIG. 37.

FIG. 39 is a top plan view of the fluid applicator of FIG. 37.

FIG. 40 is a rear elevation view of the fluid applicator of FIG. 37.

FIG. 45A is a top plan view of left and right scrapers of FIG. 44A.

FIG. 45B is a bottom plan view of left and right scrapers of FIG. 45A.

FIG. 45C is a front elevation view of left and right scrapers of FIG. 45A.

FIG. 45D is a rear elevation view of left and right scrapers of FIG. 45A.

FIG. 46A is a right side elevation view of a right scraper of FIG. 45A.

FIG. 46B is a left side elevation view of a right scraper of FIG. 45A.

FIG. 47A is a left side elevation view of a left scraper of FIG. 45A.

FIG. 47B is a right side elevation view of a left scraper of FIG. 45A.

FIG. 48A is a partial perspective view of the trench closing assembly of FIG. 44A with parts removed for viewing.

FIG. 48B is a bottom plan view of the trench closing assembly of FIG. 48A.

FIG. 48C is a right side elevation view of the trench closing assembly of FIG. 48A.

FIG. 48D is a left side elevation view of the trench closing assembly of FIG. 48A.

DESCRIPTION

All references cited herein are hereby incorporated by reference in their entireties. In the event of a conflict in a definition in the present disclosure and that of a cited reference, the present disclosure controls.

Figure 1:
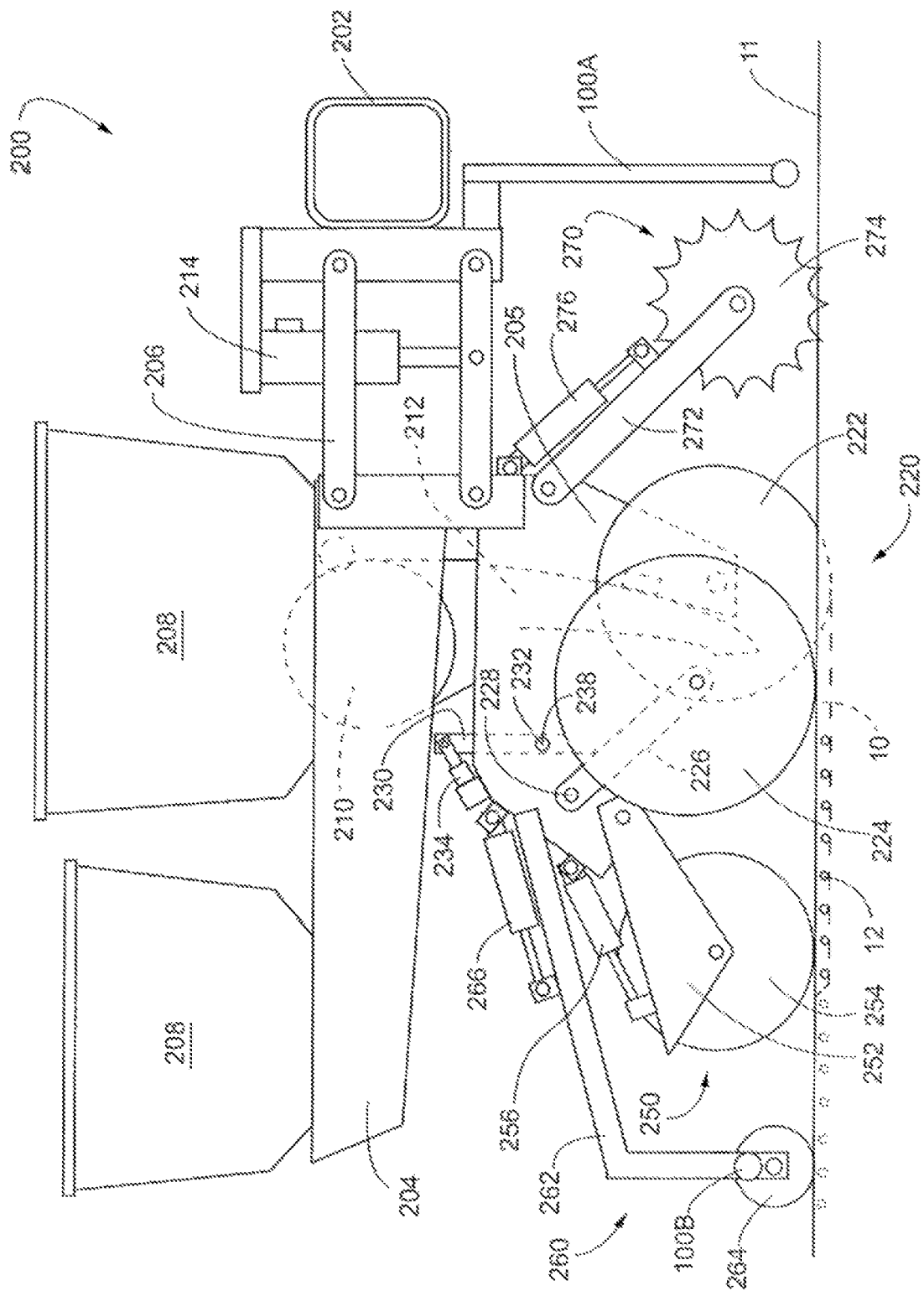
FIG. 1 is a side elevation view of an embodiment of a row unit of an agricultural planter.

Referring now to the drawings, wherein like reference numerals designate identical or corresponding parts throughout the several views, FIG. 1 illustrates an embodiment of an agricultural planter row unit 200. The row unit 200 is comprised of a frame 204 pivotally connected to a toolbar 202 by a parallel linkage 206 enabling each row unit 200 to move vertically independently of the toolbar 202. The frame 204 operably supports one or more hoppers 208, a seed meter 210, a seed delivery mechanism 212, a downforce control system 214, a seed trench opening assembly 220, a trench closing assembly 250, an optional packer wheel assembly 260, and an optional row cleaner assembly 270. It should be understood that the row unit 200 shown in FIG. 1 may be for a conventional planter or the row unit 200 may be a central fill planter, in which case the hoppers 208 may be replaced with one or more mini-hoppers and the frame 204 modified accordingly as would be recognized by those of skill in the art.

The optional downforce control system 214 is disposed to apply lift and/or downforce on the row unit 200 such as disclosed in U.S. Publication No. US2014/0090585. The downforce applied by downforce control system 214 can be determined by methods disclosed in U.S. Pat. No. 9,173,339.

The seed trench opening assembly 220 includes a pair of opening discs 222 rotatably supported by a downwardly extending shank member 205 of the frame 204. The opening discs 222 are arranged to diverge outwardly and rearwardly so as to open a v-shaped trench 10 in the soil 11 as the planter traverses the field. The seed delivery mechanism 212, such as a seed tube or seed conveyor, is positioned between the opening discs 222 to deliver seed from the seed meter 210 into the opened seed trench 10. The depth of the seed trench 10 is controlled by a pair of gauge wheels 224 positioned adjacent to the opening discs 222. The gauge wheels 224 are rotatably supported by gauge wheel arms 226 which are pivotally secured at one end to the frame 204 about pivot pin 228. A rocker arm 230 is pivotally supported on the frame 204 by a pivot pin 232. It should be appreciated that rotation of the rocker arm 230 about the pivot pin 232 sets the depth of the trench 10 by limiting the upward travel of the gauge wheel arms 226 (and thus the gauge wheels) relative to the opening discs 222. The rocker arm 230 may be adjustably positioned via a linear actuator 234 mounted to the row unit frame 204 and pivotally coupled to an upper end of the rocker arm 230. The linear actuator 234 may be controlled remotely or automatically actuated as disclosed, for example, in International Publication No. WO2014/186810.

An optional downforce sensor 238 is configured to generate a signal related to the amount of force imposed by the gauge wheels 224 on the soil. In some embodiments the pivot pin 232 for the rocker arm 230 may comprise the downforce sensor 238, such as the instrumented pins disclosed in U.S. Pat. No. 8,561,472.

An optional seed meter 210 may be any commercially available seed meter, such as a finger-type meter or a vacuum seed meter. One exemplary vacuum seed meter is the VSet® meter, available from Precision Planting LLC, 23207 Townline Rd, Tremont, IL 61568.

An optional packer wheel assembly 260 comprises an arm 262 pivotally attached to the row unit fame 204 and extends rearward of the closing wheel assembly 250 and in alignment therewith. The arm 262 rotatably supports a packer wheel 264. An actuator 266 is pivotally attached at one end to the arm 262 and at its other end to the row unit frame 204 to vary the amount of downforce exerted by the packer wheel 264 to pack the soil over the seed trench 10.

An optional row cleaner assembly 270 may be the CleanSweep® system available from Precision Planting LLC, 23207 Townline Rd, Tremont, IL 61568. The row cleaner assembly 270 includes an arm 272 pivotally attached to the forward end of the row unit frame 204 and aligned with the trench opening assembly 220. A pair of row cleaner wheels 274 are rotatably attached to the forward end of the arm 272. An actuator 276 is pivotally attached at one end to the arm 272 and at its other end to the row unit frame 204 to adjust the downforce on the arm to vary the aggressiveness of the action of the row cleaning wheels 274 depending on the amount of crop residue and soil conditions.

Figure 2:
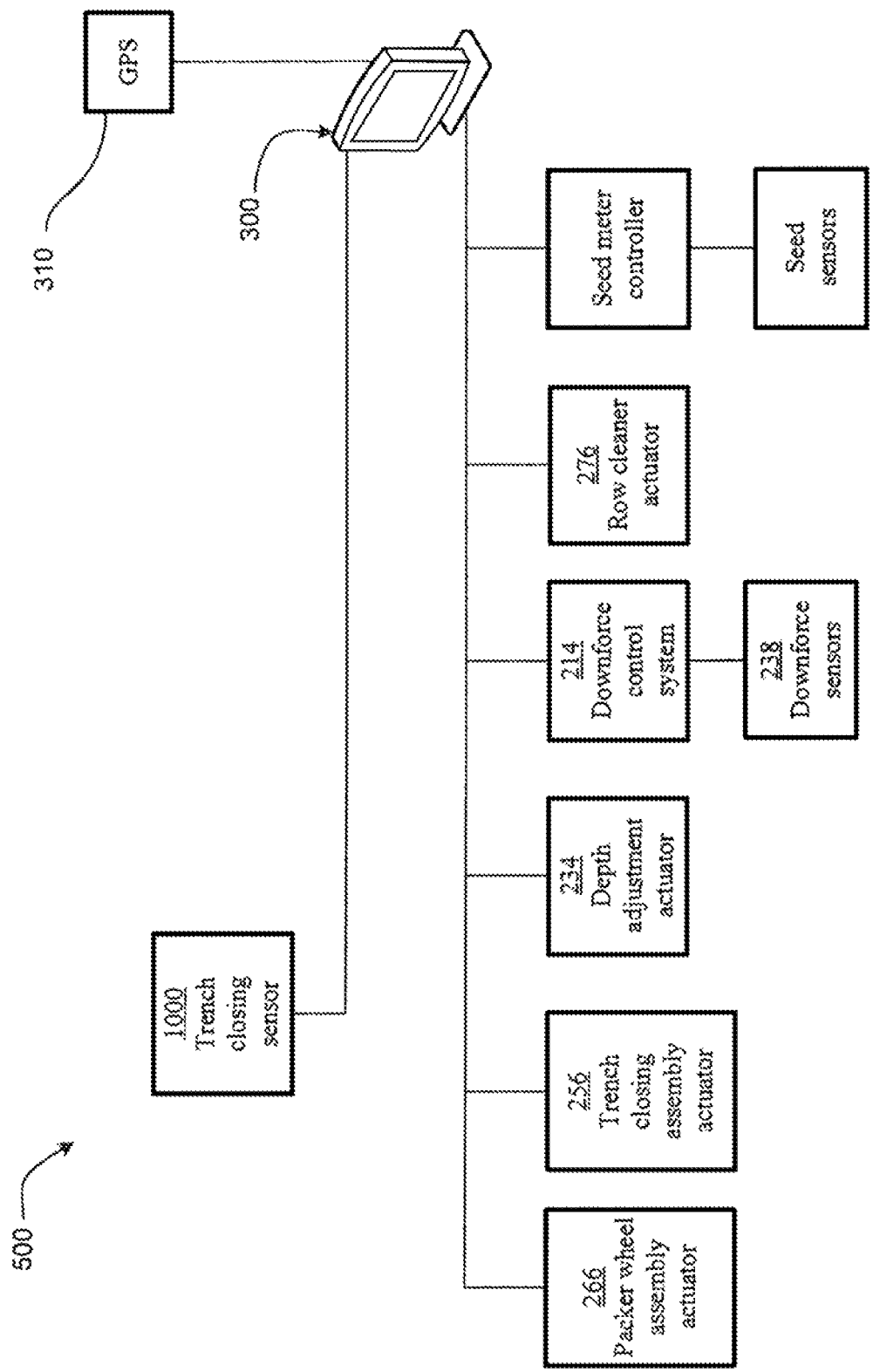
FIG. 2 is a diagram of a system for implementing operational control of the closing wheel assembly based on signals generated by the trench closing sensor.
Figure 3:
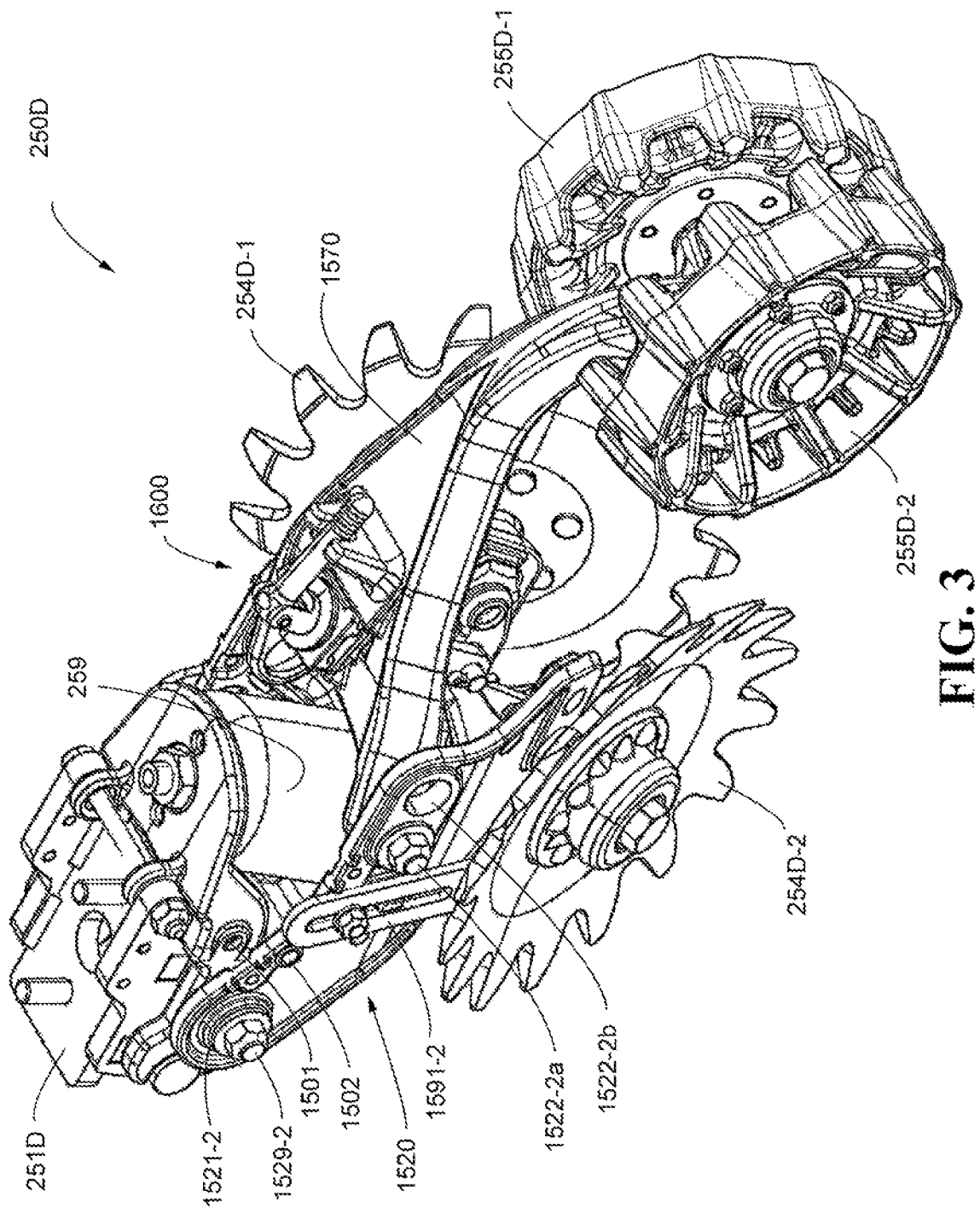
FIG. 3 is a left side perspective view of an embodiment of a trench closing assembly.

Referring to FIG. 2, a monitor 300 is visible to an operator within the cab of a tractor pulling the planter. The monitor 300 may be in signal communication with a GPS unit 310, the trench closing assembly actuator 256 and the optional packer wheel assembly actuator 266 to enable operational control of the trench closing assembly 250 and the optional packer wheel assembly 260 based on the signals generated by trench closing sensors 1000, which are described in International Publication No. WO2017/197274. Also as discussed later, the monitor 300 may be programmed to display operational recommendations based on the signals generated by the trench closing sensors 1000. The monitor 300 may also be in signal communication with the row cleaner actuator 276, the downforce control system 214, the depth adjustment actuator 234 to enable operational control of row cleaner assembly 270, the downforce control system 214 and the trench opening assembly 230, respectively.

Trench Closing Assembly

Examples of Trench Closing Assemblies can be found in U.S. Patent Application Nos. 62/637,372, filed 1 Mar. 2018, 62/644,201, filed 16 Mar. 2018, 62/731,813, filed 14 Sep.

2018, 62/791,203, filed on 11 Jan. 2019, and in International Application No. PCT/US2019/020452, filed on 2 Mar. 2019. Also, an example of a trench closing assembly is the FurrowForce™ trench closing assembly available from Precision Planting, LLC.

FIGS. 3-27 illustrate a trench closing assembly 250D according to an embodiment. In this embodiment, trench closing assembly 250D has a main frame 251D that is connected to row unit 200. Trench closing assembly 250D has a frame 1520, an actuator 259, a pair of closing wheels 254D-1, 254D-2, and optionally, a press wheel 255D.

Turning to FIGS. 14-19, frame 251D has a connection bracket 1540 and an attachment bracket 1550. Connection bracket 1540 can have one or more bolts 1209D extending through apertures 1207D in connection bracket 1540 for mounting the frame 251D to the row unit 200. Connection bracket 1540 (as with connection brackets 1200 and 1201A) can be varied to mate attachment to different styles of row units. Connection bracket 1540 has a first side 1542-1, a second side 1542-2, and a plate 1543 disposed between first side 1542-1 and second side 1542-2. First side 1542-1 and second side 1542-2 each have a post 1541-1 and 1541-2, respectively, protruding perpendicularly outward.

Attachment bracket 1550 connects to connection bracket 1540. Attachment bracket 1550 provides a common structure for mounting other parts while connection bracket 1540 has a varied structure to mate with different styles of row units. Attachment bracket has a first side 1552-1, a second side 1552-2, a crossbar 1557 disposed between first side 1552-1 and second side 1552-2, and plate 1553 disposed between first side 1552-1 and second side 1552-2, and plate 1553. First side 1552-1 and second side 1552-2 each have a u-shaped opening 1555-1 and 1555-2, respectively, for connection to posts 1541-1 and 1541-2, respectively. First side 1552-1 and second side 1552-2 have openings 1558-1 and 1558-2, respectively, for accepting pivots 1529-1 and 1529-2, respectively. Attachment bracket 1550 can be secured to connection bracket with fastener 1549. Optionally, attachment bracket 1550 can also have an opening 1501 disposed in first side 1552-1 or second side 1552-2 for accepting a pin. While connection bracket 1540 is illustrated with separate parts it may be fabricated as a unitary part.

Figure 7:
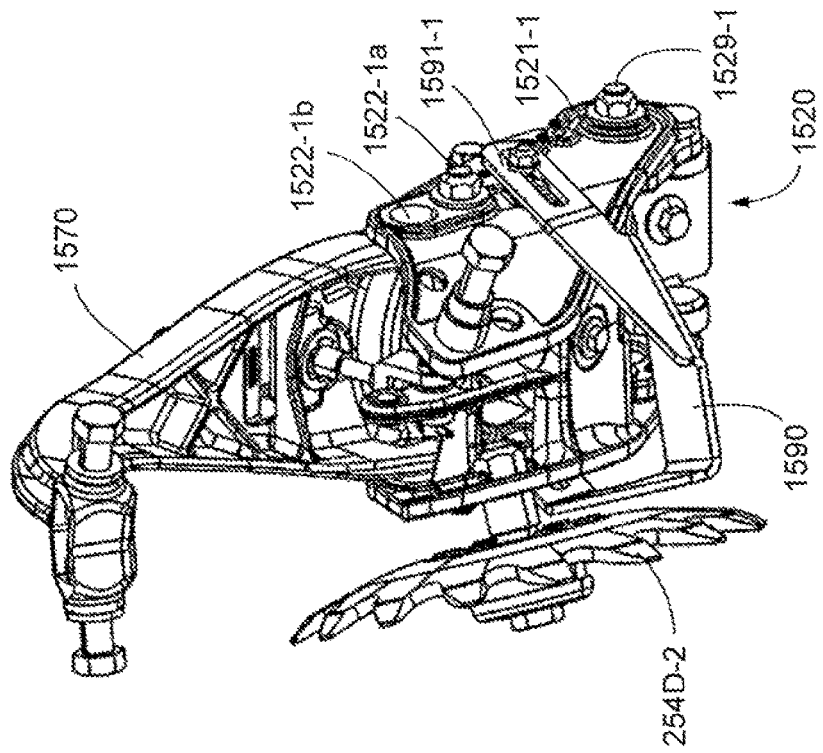
FIG. 7 is a bottom perspective view of the trench closing assembly of FIG. 6.
Figure 6:
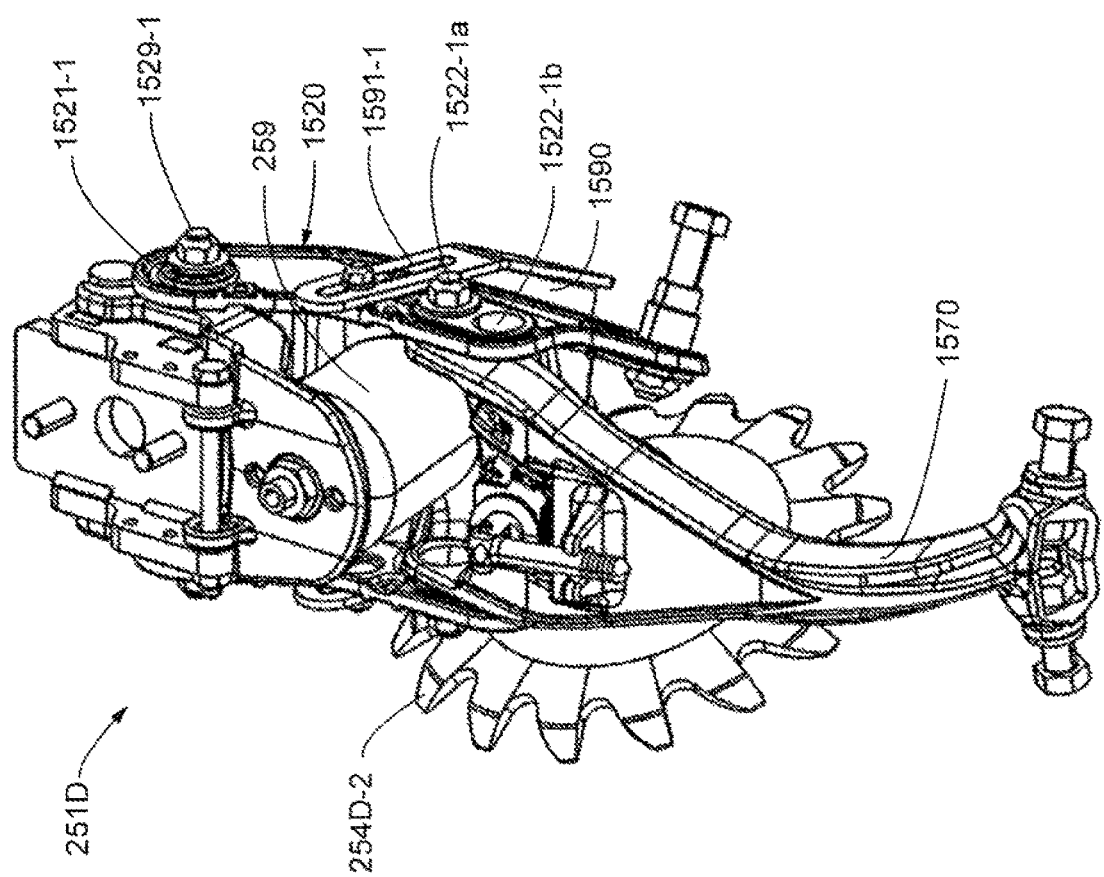
FIG. 6 is a top perspective view of the trench closing assembly of FIG. 3 with some parts removed.

Optionally, as illustrated in FIGS. 5 and 7, a guard 1590 can be disposed on frame 1520 ahead of closing wheels 254D-1, 254D-2. Guard 1590 can prevent rocks, rootballs, or other trash from approaching closing wheels 254D-1, 254D-2. The height of guard 1590 can be adjusted by changing the placement of arms 1591-1 and 1591-2 on frame 1520.

Figures 20, 21:
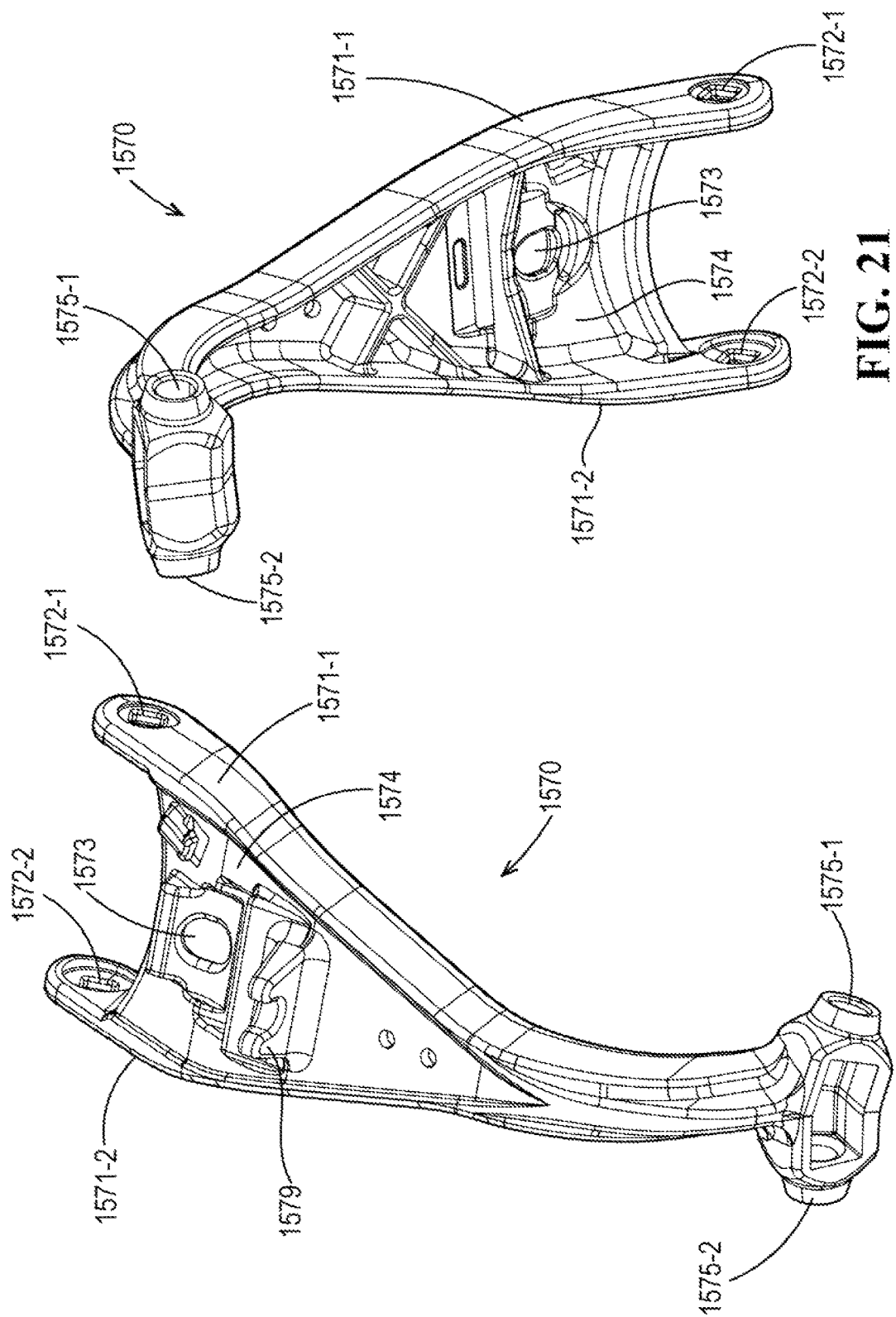
FIG. 20 is top perspective view of the mounting arm of the trench closing assembly of FIG. 3.
FIG. 21 is a bottom perspective view of the mounting arm of FIG. 20.
Figure 23:
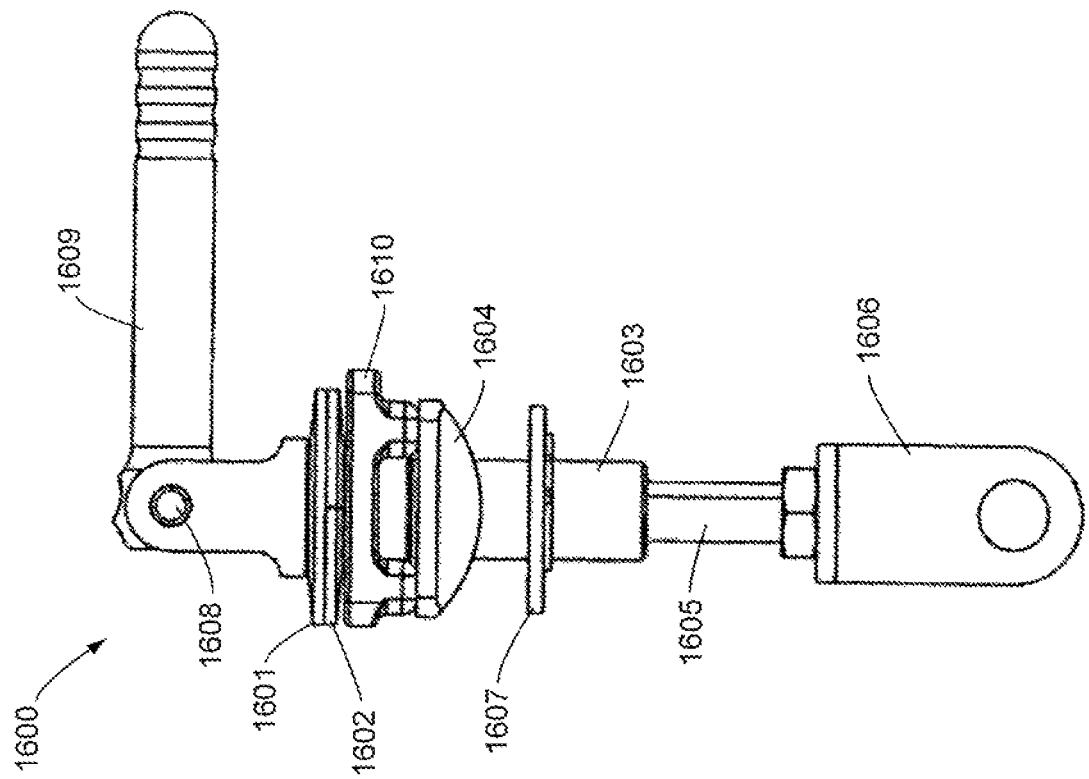
FIG. 23 is a left side elevation view of the handle assembly of FIG. 22.
Figure 22:
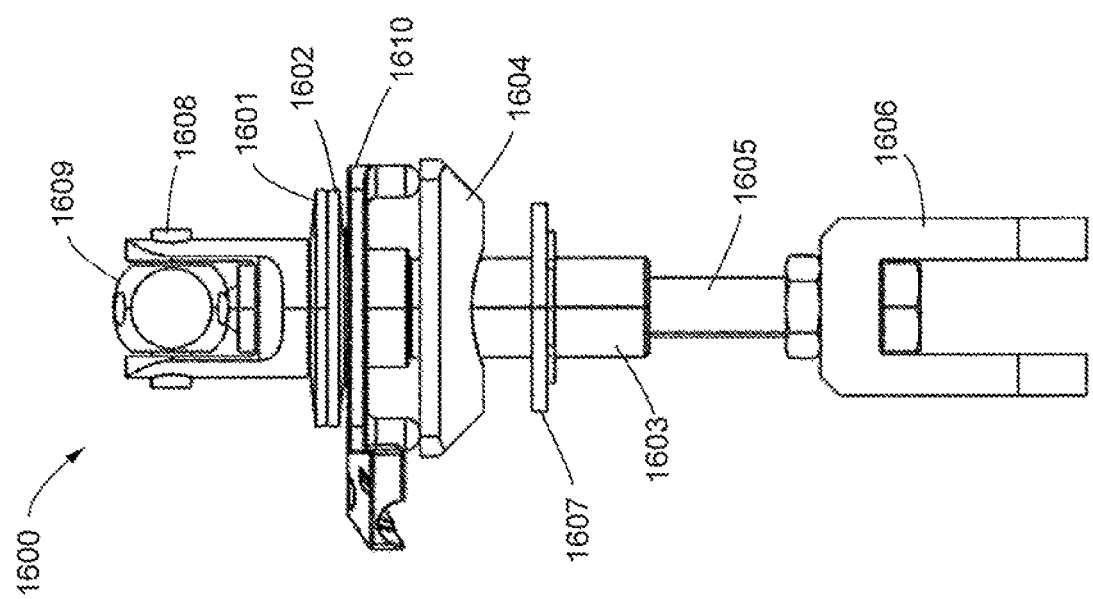
FIG. 22 is a front elevation view of the handle assembly of the trench closing assembly of FIG. 3.
Figure 26:
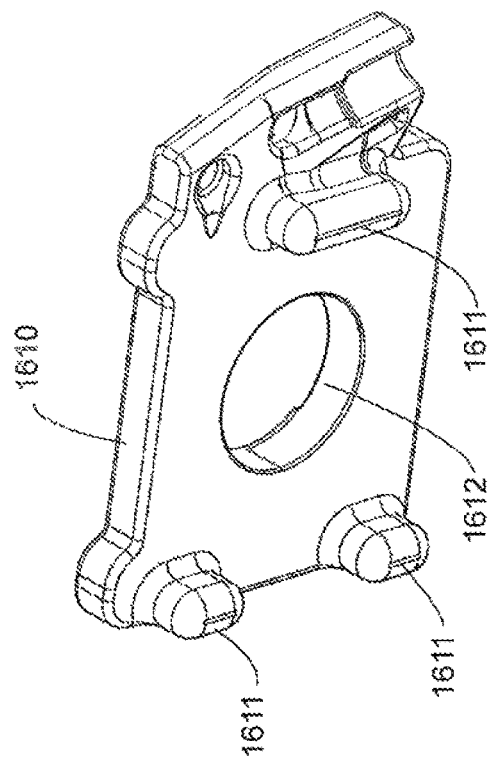
FIG. 26 is a top perspective view of the pressure sensor of FIG. 25.
Figure 25:
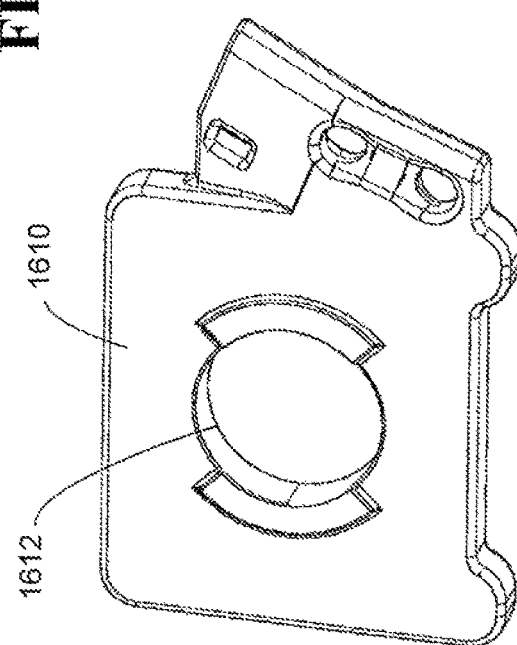
FIG. 25 is a bottom perspective view of the pressure sensor of the handle assembly of FIG. 22.
Figure 24:
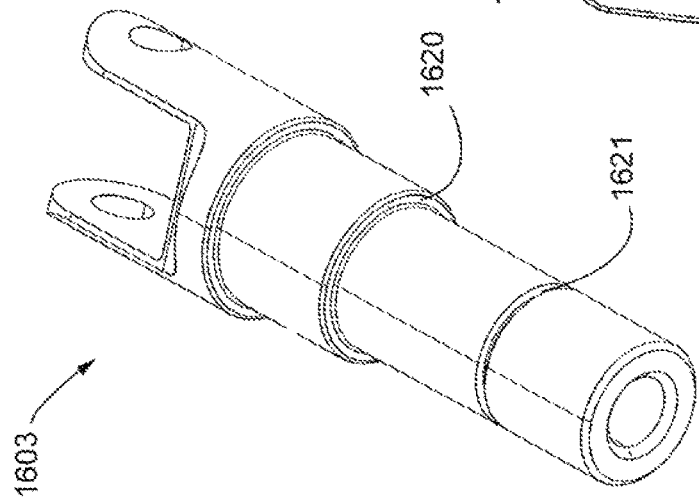
FIG. 24 is a perspective view of the shank of the handle assembly of FIG. 22.
Figure 27:
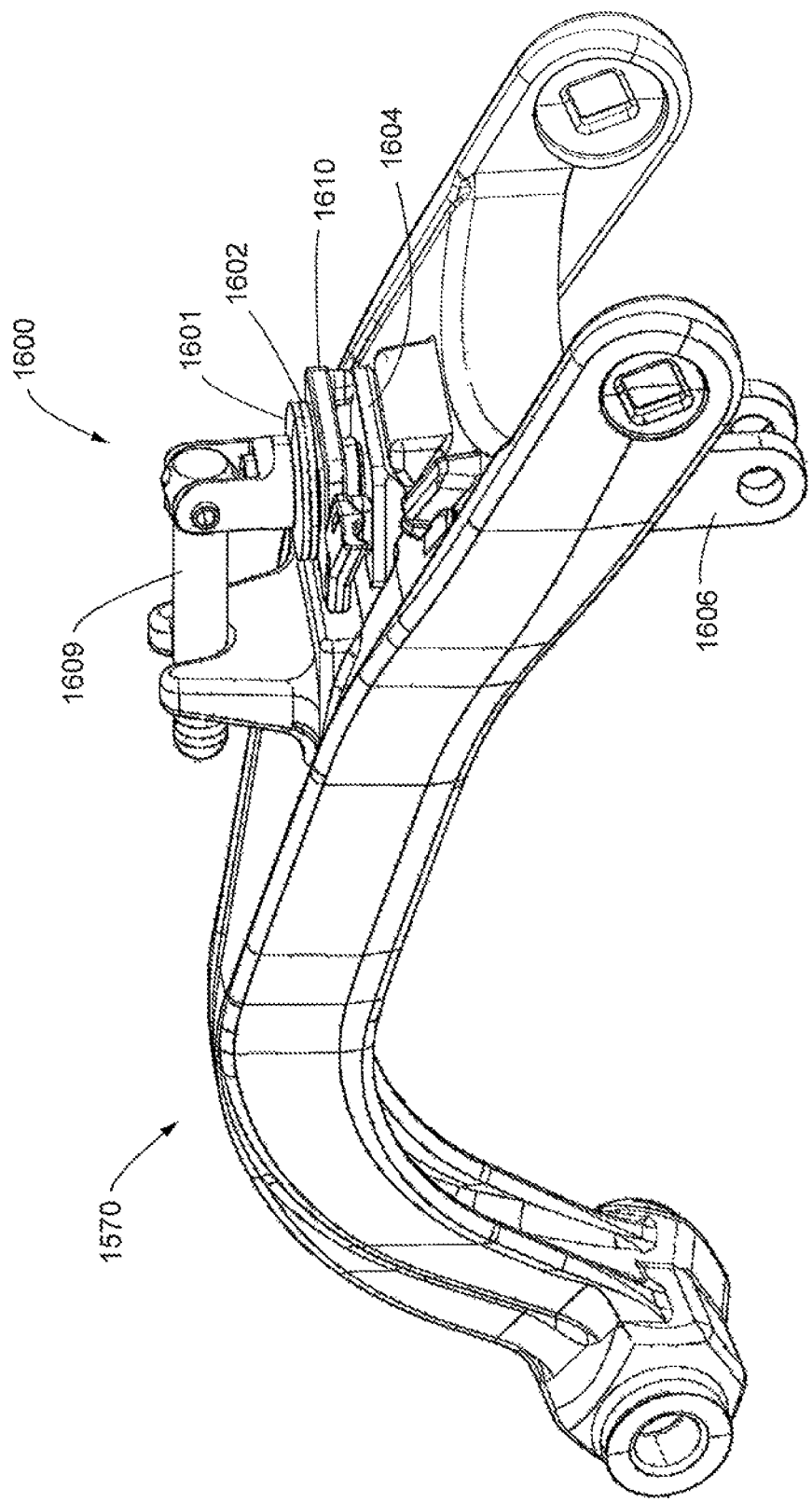
FIG. 27 is a perspective view of the handle assembly and mounting arm of the trench closing assembly of FIG. 3.

Turning to FIGS. 20-21, mounting arm 1570 has a first side 1571-1, a second side 1571-2, a plate 1574 disposed between first side 1571-1 and second side 1571-2, a hole 1573 through plate 1574 for passage of sleeve 1603, axle hubs 1575-1 and 1575-2 for mounting press wheels 255D-1 and 255D-2, respectively, and, optionally, a handle cradle 1579.

Turing to FIGS. 6-13, frame 1520 is pivotally connected to frame 251D through pivots 1529-1 and 1529-2. Frame 1520 has a first side 1526-1 and a second side 1526-2, a plate 1525 connecting first side 1526-1 and second side 1526-2, a connection arm 1527 extending rearwardly along the direction of travel from plate 1525, a cross-brace 1528-1 connecting connection arm 1527 to first arm 1526-1, a cross-brace 1528-2 connecting connection arm 1527 to second arm 1526-2. First side 1526-1 and second side 1526-2 have openings 1521-1 and 1521-2 for disposing about pivots 1529-1 and 1529-2, respectively. Mounting arm 1570 can attach to frame 1520 at connections 1522-1a and 1522-2a or to 1522-1b and 1522-2b. The plurality of connections allows the distance between closing wheels 254D-1, 254D-2, and press wheel 255D (255D-1, 255D-2) to be changed. There can be one connection 1522 or a plurality of connections 1522. As the mounting arm 1570 position is changed, there are also corresponding connections 1523-a and 1523-b (matching in number to connection 1522) for connecting handle assembly 1600 to frame 1520. Frame 1520 also has connections 1524 (1524-1a, 1524-1b, 1524-2a, and 1524-2b) for mounting closing wheels 254D-1, 254D-2. While there can be one set of connections 1524, the plurality of connections 1524 allow for forward and back placement of the closing wheels 254D-1, 254D-2 on frame 1520, or closing wheels 254D-1, 254D-2 can be offset from each other with one closing wheels 254D-1, 254D-2 being mounted to a forward location (the "a" position) or to a rear location (the "b" position). As illustrated, closing wheels 254D-1, 254D-2 are offset from each other. Optionally, frame 1520 can have an opening 1502 in either the first side 1526-1 or second side 1526-2 (shown in 1526-2) for accepting a pin. Frame 1520 can be raised to allow opening 1501 and opening 1502 to align for accepting a pin (not shown). This allows trench closing assembly 250D to be raised for transport or when closing is not needed. While illustrated on one side, openings 1501 and 1502 can be disposed on both sides.

Actuator 259 is disposed between plate 1525 and plate 1553 to apply a force to plate 1553 to cause frame 1520 to pivot and apply pressure to closing wheels 254D-1 and 254D-2.

Turning to FIGS. 22-27, handle assembly 1600 is illustrated. Handle assembly 1600 has a sleeve 1603 having a first diameter 1620 and a second diameter 1621. Second diameter 1621 is small enough to be disposed through load sensor 1610, and first diameter 1620 is large enough so that it cannot pass through load sensor 1610. Sleeve 1603 has a bracket 1622 (u-shaped bracket as illustrated or any other shape) for accepting handle 1609. Disposed on sleeve 1603 below bracket 1622 are bevel washers 1601 and 1602. Bevel washer 1601 and bevel washer 1602 are disposed with their concave surfaces facing each other. This allows bevel washers 1601 and 1602 to flex to absorb shocks experienced by trench closing assembly 250D to prevent overloading of load sensor 1610. Before bevel washers 1601 and 1602 reach maximum flex, first diameter 1620 will contact plate 1604 to limit the travel. Load sensor 1610 is a pancake load sensor. Load sensor 1610 has a hole 1612 for passage of sleeve 1603. Disposed on the underside of load sensor 1610 are a plurality of feet 1611 to allow load sensor 1610 to flex and measure force. Load sensor 1610 can be disposed on mounting arm 1570 directly, or as shown, a plate 1604 can be disposed between load sensor 1610 and mounting arm 1570. Optionally, a washer 1607 can be disposed about sleeve 1603 under mounting arm 1570. Handle assembly 1600 is connected to frame 1520 at connection 1523-a or 1523-b with a bracket 1606 (u-shaped bracket) and a bolt 1605 connecting bracket 1606 with sleeve 1603. In the horizontal position, handle 1609 locks handle assembly 1600 in place against mounting arm 1570. In the vertical position, handle 1609 releases handle assembly from engagement with mounting arm 1570. Bolt 1605 can be adjusted to set a vertical placement of mounting arm 1570 relative to frame 1520.

Load sensor 1610 can be connected to a network directly through a plug (not shown) having a CAN processor to allow direct communication over a CAN network. The CAN processor can communicate pressure readings and provide control signals over the CAN network. Alternatively, load sensor 1610 can be connected to a control module (either an on-row module, or a module controlling a plurality of row) to communicate pressure readings that are then processed by the control module.

Soil Deflector

Figure 30:
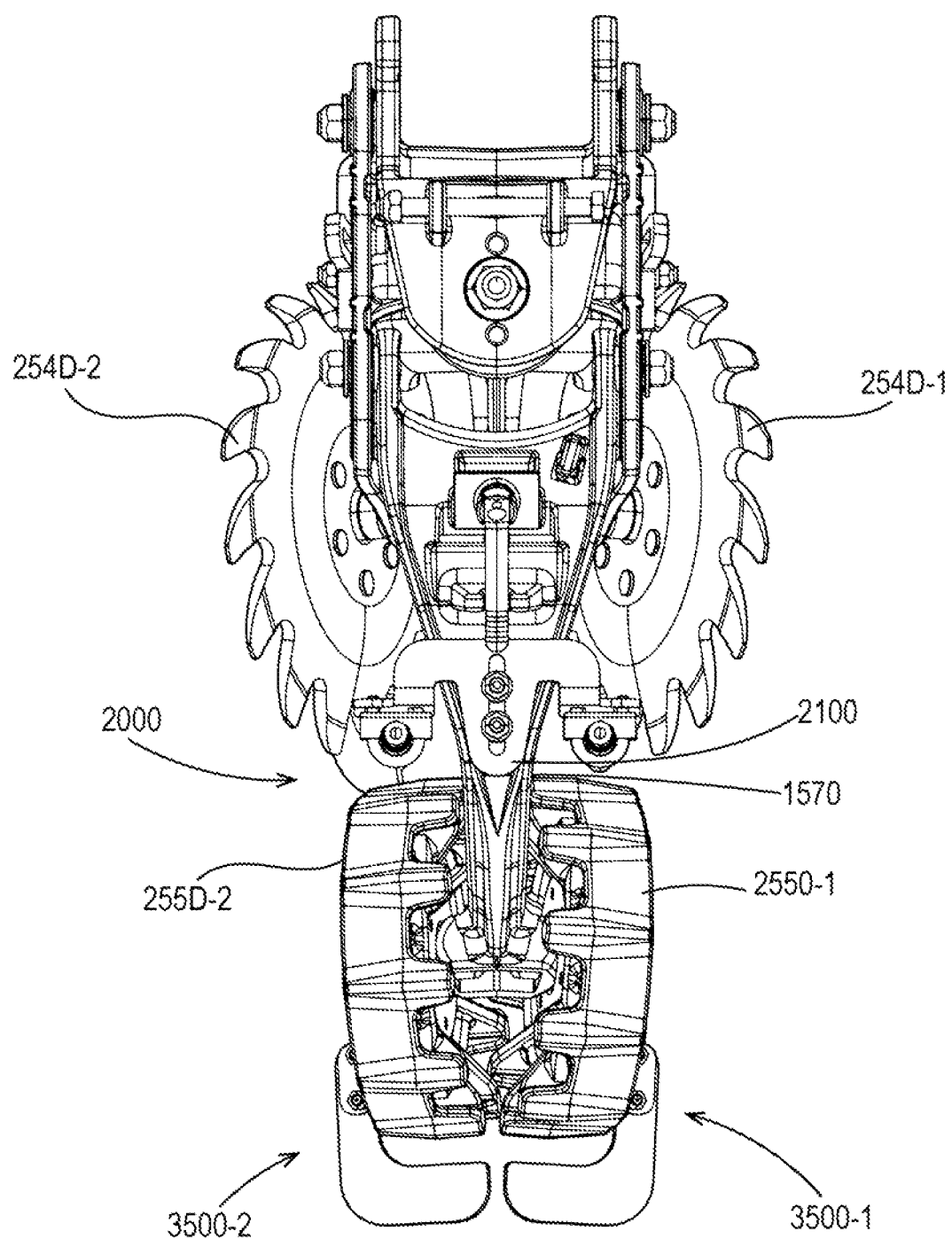
FIG. 30 is a top plan view of the trench closing assembly of FIG. 28.
Figure 31:
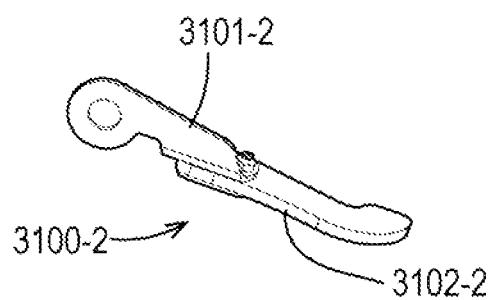
FIG. 31 is a left side elevation view of the closing wheel soil deflector of FIG. 28.
Figure 32:
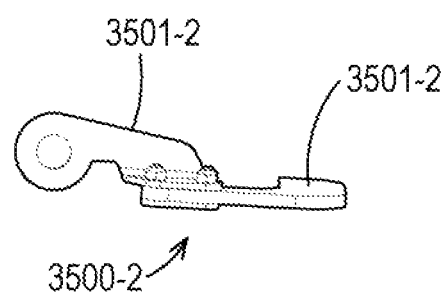
FIG. 32 is a left side elevation view of the press wheel soil deflector of FIG. 28.
Figure 33:
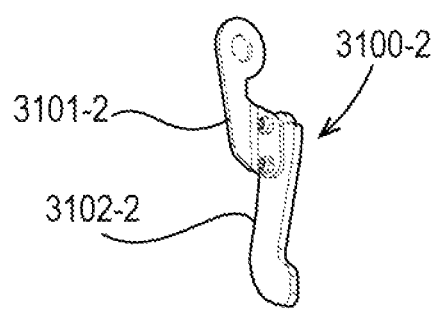
FIG. 33 is a perspective view of the closing wheel soil deflector of FIG. 31.
Figure 34:
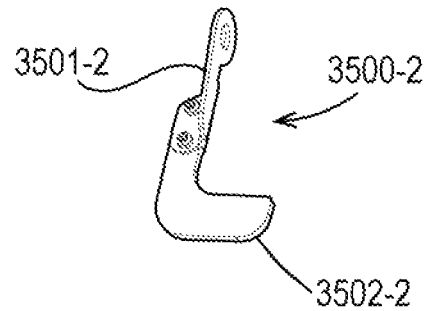
FIG. 34 is a perspective view of the press wheel soil deflector of FIG. 32.
Figure 35:
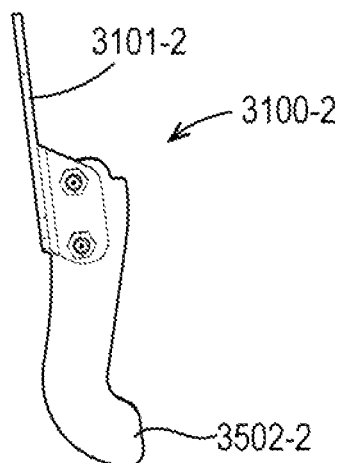
FIG. 35 is a top plan view of the closing wheel soil deflector of FIG. 31.
Figure 36:
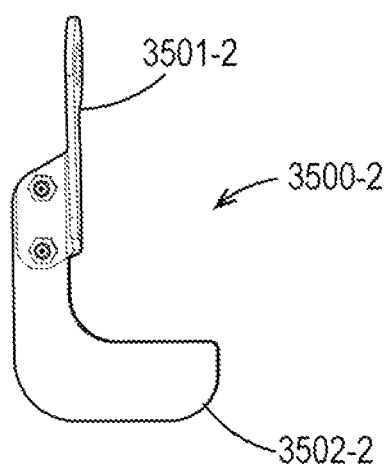
FIG. 36 is a top plan view of the press wheel soil deflector of FIG. 32.

FIGS. 28-30 illustrate soil deflectors (3100, 3500) and fluid applicator (2000) disposed on closing assembly 250D. Soil deflector 3100 is illustrated on the left, and the right (not shown) is the mirror image of the left. Soil deflectors 3100 and soil deflectors 3500 are illustrated as two parts, but they can be made unitary parts. Soil deflectors 3100 and 3500 can keep dirt/mud from spraying or "rooster tailing" as the trench closing system 250D traverses the field. Also, soil deflectors 3100 and 3500 can scrape closing wheels 254D and/or press wheels 255D, respectively, by being adjusted to contact closing wheels 254D and/or press wheels 255D.

Soil deflector 3100-2 is connected to axle 257-2 and extends rearward opposite the direction of travel adjacent to closing wheel 254D-2. Depending on the shape of closing wheel 254D, soil deflector 3100 can be shaped to follow the contour of closing wheel 254D or contact closing wheel 254D. Soil deflector 3100-2 can be made of two parts, bracket 3101-2 and deflector 3102-2. When connected to axle 257-2, optionally a spacer (not shown), such as washer or bushing, can be disposed on axle 257-2 to vary the spacing between soil deflector 3100-2 and closing wheel 254D-2. Optionally, a connection orientation between bracket 3102-2 and deflector 3102-2 can be changed to change the orientation of deflector 3102-2 with closing wheel 254D-2. In one embodiment, soil deflector 3100 extends beyond the circumference of closing wheel 254D, and optionally, extends behind closing wheel 254D toward frame 1520. Deflector 3102-2 can be made from a flexible material. A flexible material is a material that will deflect when impacted by soil when trench closing assembly 250D is operated at typical planting speeds (e.g., up to 20 mph (32 kph) or up to 10 mph (16 kph)). In one embodiment, deflector 3102-2 is polyurethane.

Optionally, soil deflector 3500 (3500-1, 3500-2) can be included for press wheels 255D (255D-1, 255D-2). While illustrated with two press wheels 255D (255D-1, 255D-2), there can be just one press wheel 255D. Soil deflector 3500 (3500-1, 3500-2) is connected to axle 258 (258-1, 258-2) and extends rearward opposite the direction of travel adjacent to press wheel 255D (255D-1, 255D-2). Depending on the shape of press wheel 255D, soil deflector 3500 can be shaped to follow the contour of press wheel 255D 254D or press wheel 255D. Soil deflector 3500-2 can be made of two parts, bracket 3501-2 and deflector 3502-2. When connected to axle 258-2, optionally a spacer (not shown), such as washer or bushing, can be disposed on axle 258-2 to vary the spacing between soil deflector 3500-2 and closing wheel 2545-2. Optionally, a connection orientation between bracket 3502-2 and deflector 3502-2 can be changed to change the orientation of deflector 3502-2 with press wheel 255D-2. In one embodiment, soil deflector 3500 extend beyond the circumference of press wheel 255D, and optionally, extend behind press wheel 255D. Deflector 3502-2 can be made from a flexible material as defined above.

Fluid Applicator

Fluid applicator 2000 is illustrated in FIGS. 37-40 according to one embodiment. Fluid applicator 2000 has a frame 2100 for connection to mounting arm 1570. An optional slot 2101 can be disposed in frame 2100 to allow for adjustment front to back along the direction of travel. While illustrated with two arms 2104 (2104-1, 2104-2), fluid applicator 2000 can have just one arm 2014. Arms 2104 (2104-1, 2104-2) are disposed on either side of mounting arm 1570. Nozzles 2120 (2120-1, 2120-2) are attached to arms 2104 (2104, 1, 2014-2), respectively. Optionally, arms 2104 (2104-1, 2104-2) can have slots 2105 (2105-1-a, 2105-1-b, 2105-2-a, 2105-2-b) to allows nozzles 2120 (2120-1, 2120-2) to be adjusted vertically. For adjustable connection, U-bolts 2110 (2110-1, 2110-2) can connect nozzle 2120 (2120-1, 2120-2) to arms 2104 (2104-1, 2104-2) through slots 2105 (2105-1-a, 2105-1-b, 2105-2-a, 2105-2-b). Optionally, slots 2105 (2105-1-a, 2105-1-b, 2105-2-a, 2105-2-b) can be sized larger than U-bolts 2110 (2110-1, 2110-2) to allow nozzles 2120 (2120-1, 2120-2) to rotate in a direction transverse to the direction of travel so that nozzles 2120 (2120-1, 2120-2) can deposit fluid closer to or further away from the trench. Optionally, frames 2111 (2111-1, 2111-2) can be included to ensure fit of nozzles 2120 (2120-1, 2120-2) to arms 2104 (2104-1, 2104-2), for example when nozzles 2120 (2120-1, 2120-2) are round. Nozzles 2120 (2120-1, 2120-2) are connected to a fluid source (not shown) for applying fluid to the soil surface. Optionally, frame 2100 can be disposed on mounting arm 1570 rotated 180° from the orientation illustrated.

Figure 41:
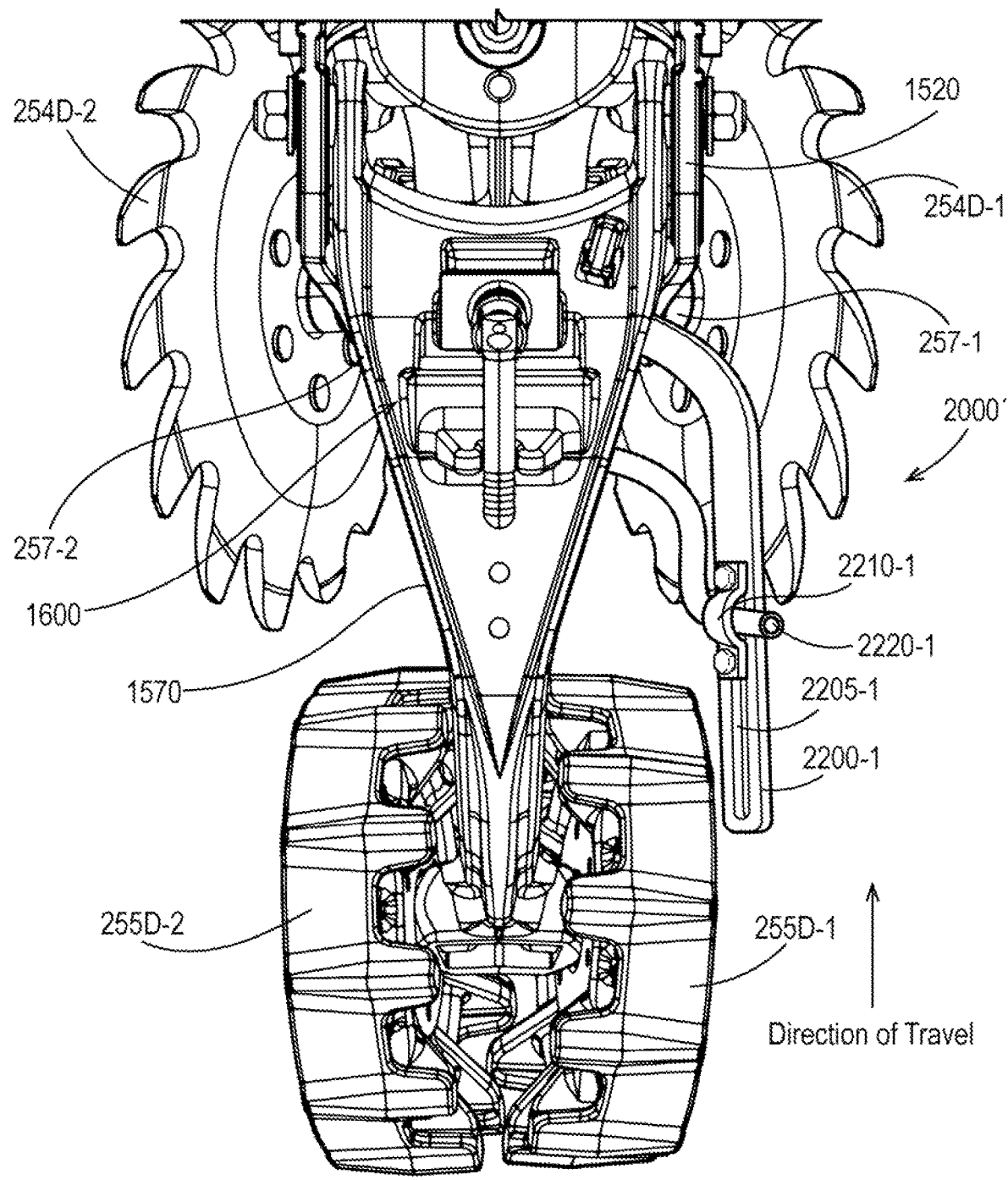
FIG. 41 is a top plan view of a fluid applicator according to an embodiment.

In an alternative embodiment, fluid applicator 2000' is illustrated in FIG. 41. While illustrated on the right side, fluid applicator 2000' can also be installed as a mirror image on the left side. An arm 2200-1 is connected to an axle 257-1 between frame 1520 and closing wheel 254D-1 and extends in a rearward direction away from the direction of travel. A nozzle 2220-1 is attached to arm 2200-1 via a bracket 2210-1. Optionally, a slot 2205-1 can be disposed in arm 2200-1 to permit adjustment of nozzle 2220-1 front to back along the direction of travel. Nozzle 2220-1 is connected to a fluid source (not shown) for applying fluid to the soil surface.

Figure 42:
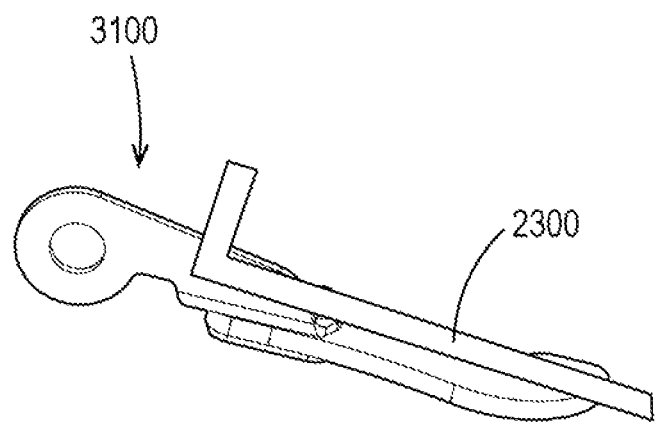
FIG. 42 is a left side elevation view of the closing wheel soil deflector of FIG. 31 and including a nozzle.
Figure 43:
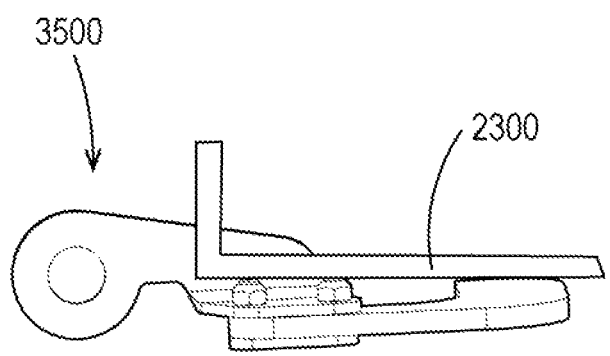
FIG. 43 is a left side elevation view of the closing wheel soil deflector of FIG. 32 and including a nozzle.
Figure 44A:
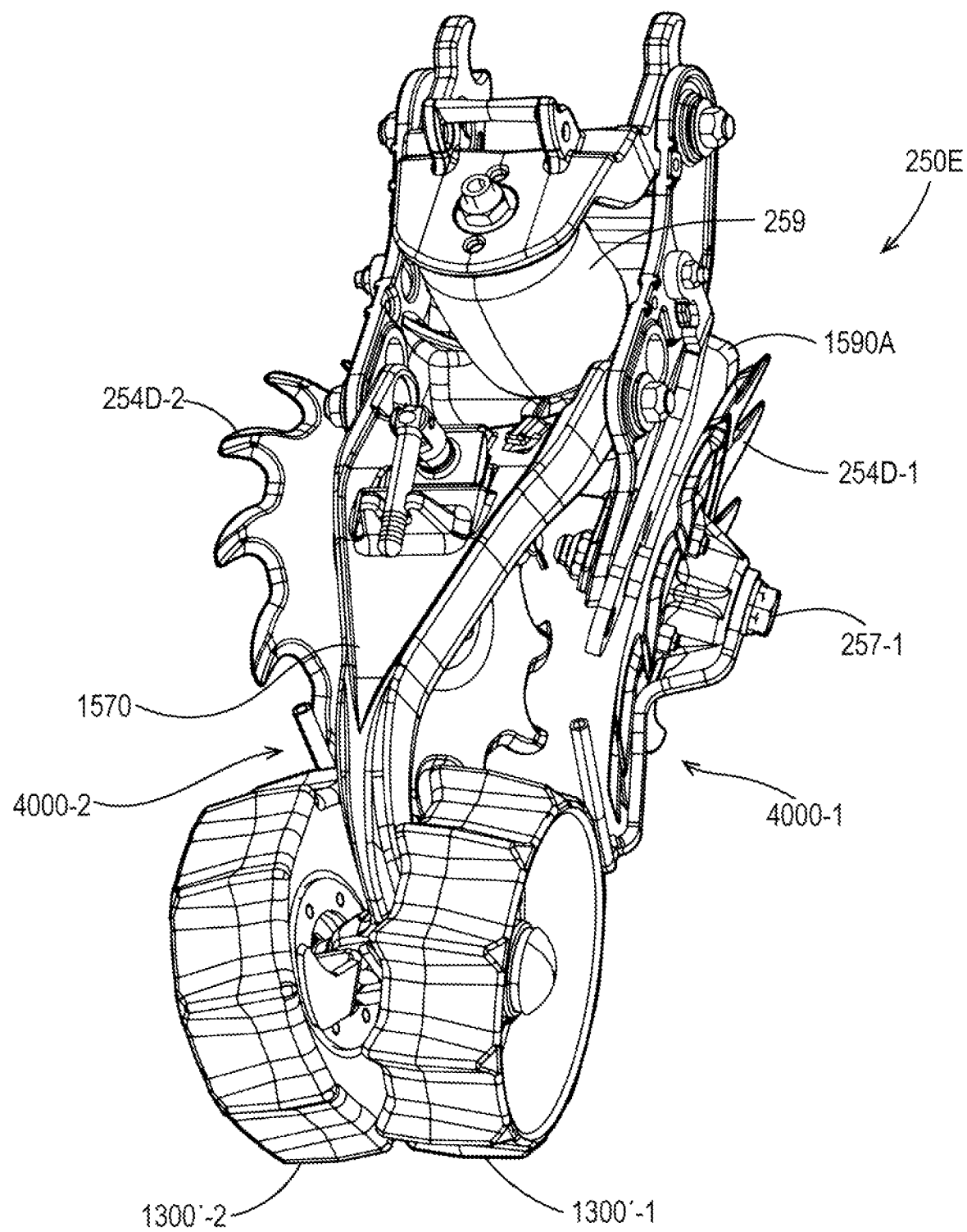
FIG. 44A is a perspective view of the trench closing assembly of FIG. 3 with a modified guard and further including a scraper with an optional fluid applicator according to an embodiment.
Figure 44C:
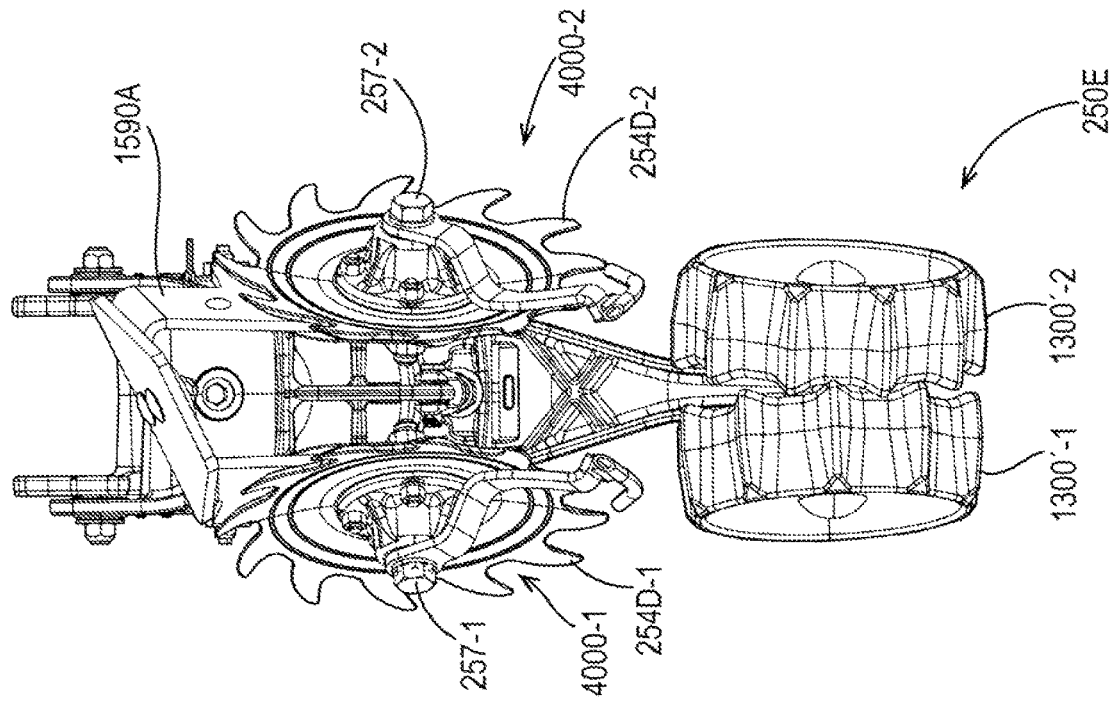
FIG. 44C is a bottom plan view of the trench closing assembly of FIG. 44A.
Figure 44B:
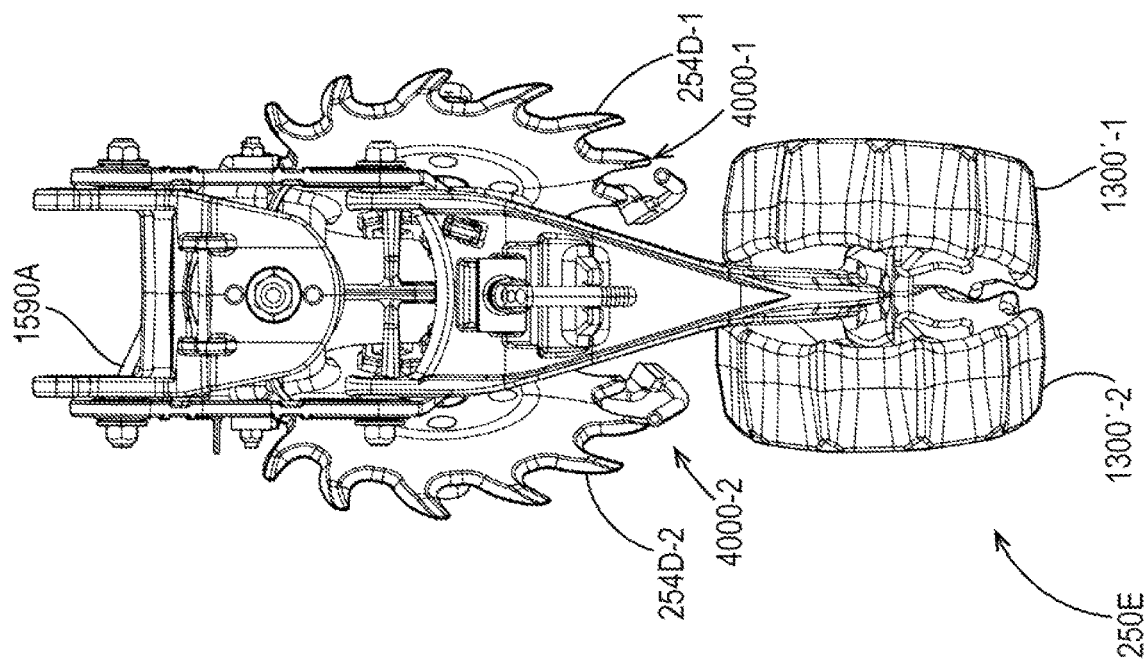
FIG. 44B is a top plan view of the trench closing assembly of FIG. 44A.
Figure 44D:
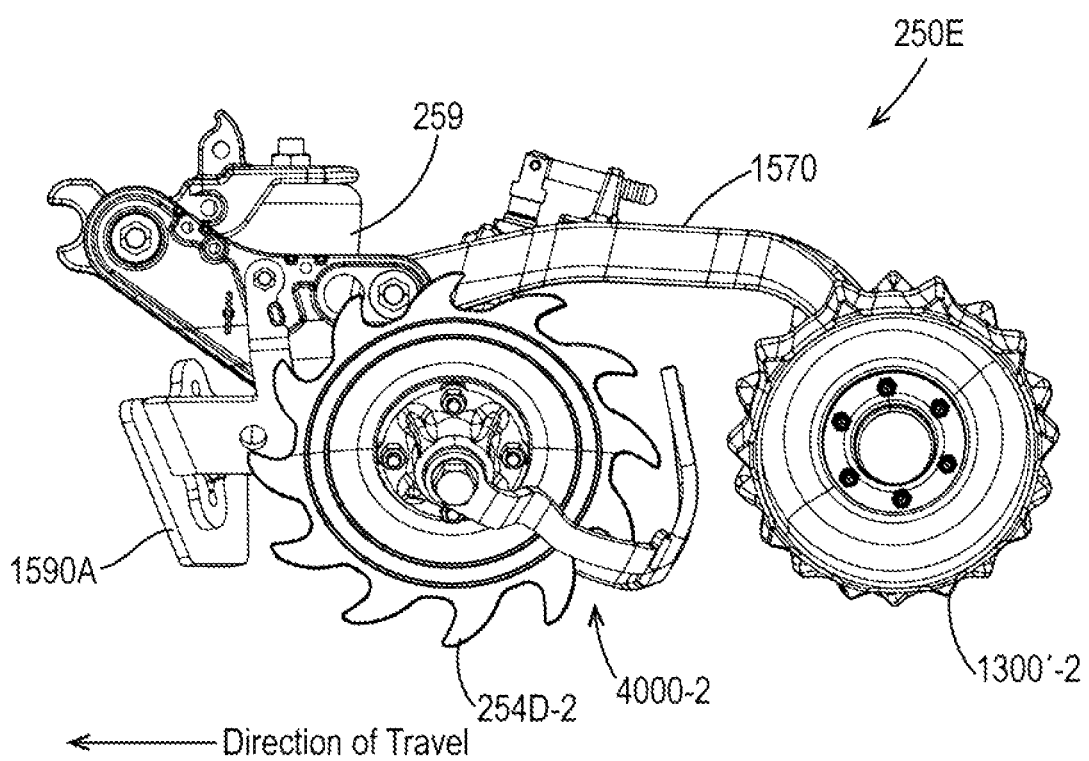
FIG. 44D is a left side elevation view of the trench closing assembly of FIG. 44A.
Figure 44E:
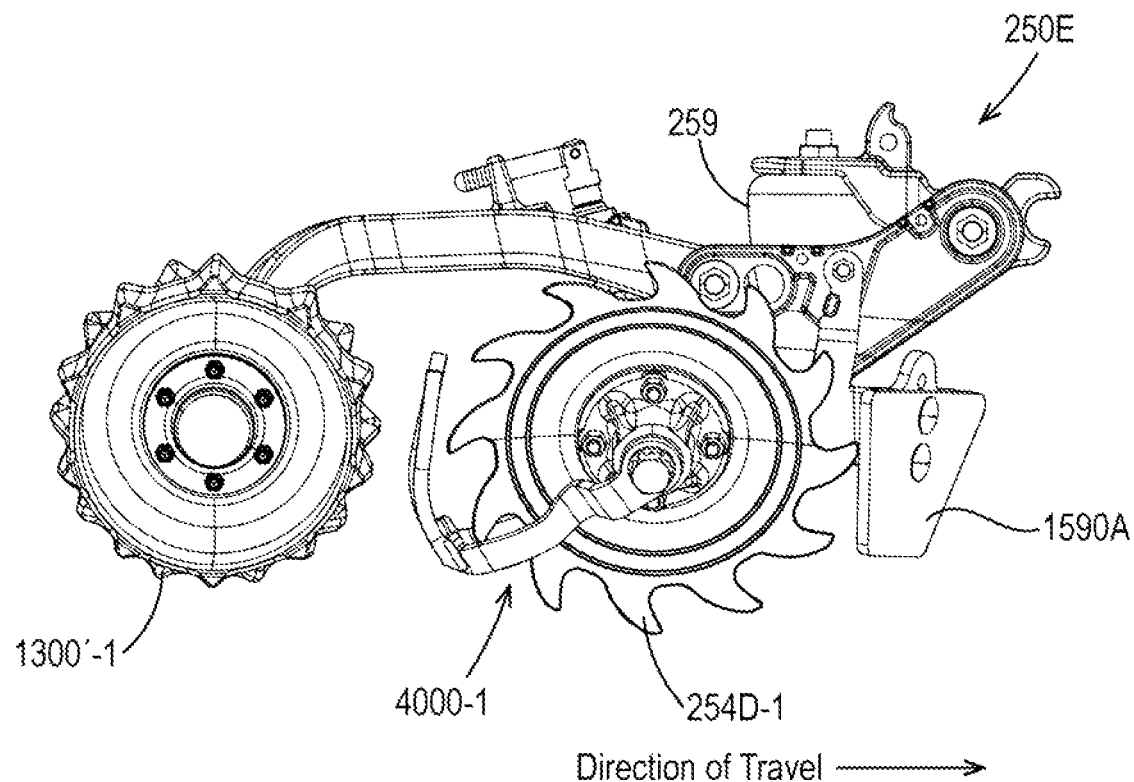
FIG. 44E is a right side elevation view of the trench closing assembly of FIG. 44A.
Figure 49A:
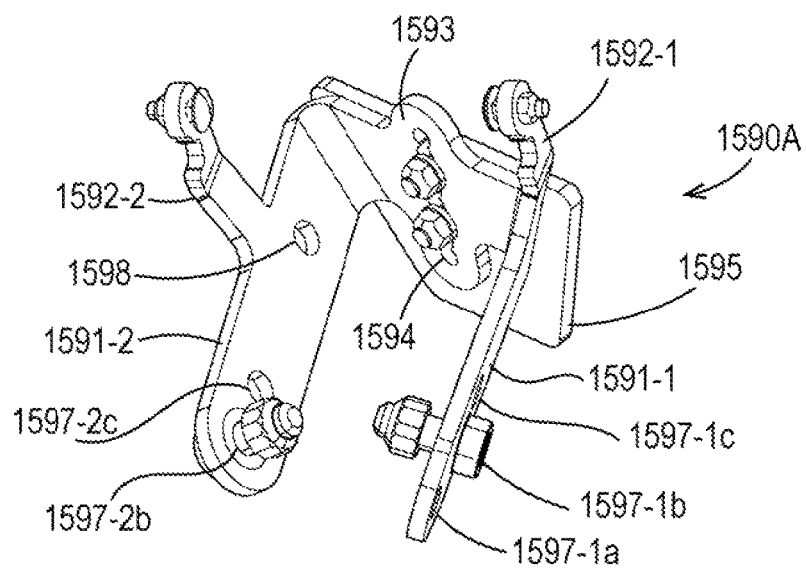
FIG. 49A is a perspective view of the guard of FIG. 44A.
Figures 49B, 49C:
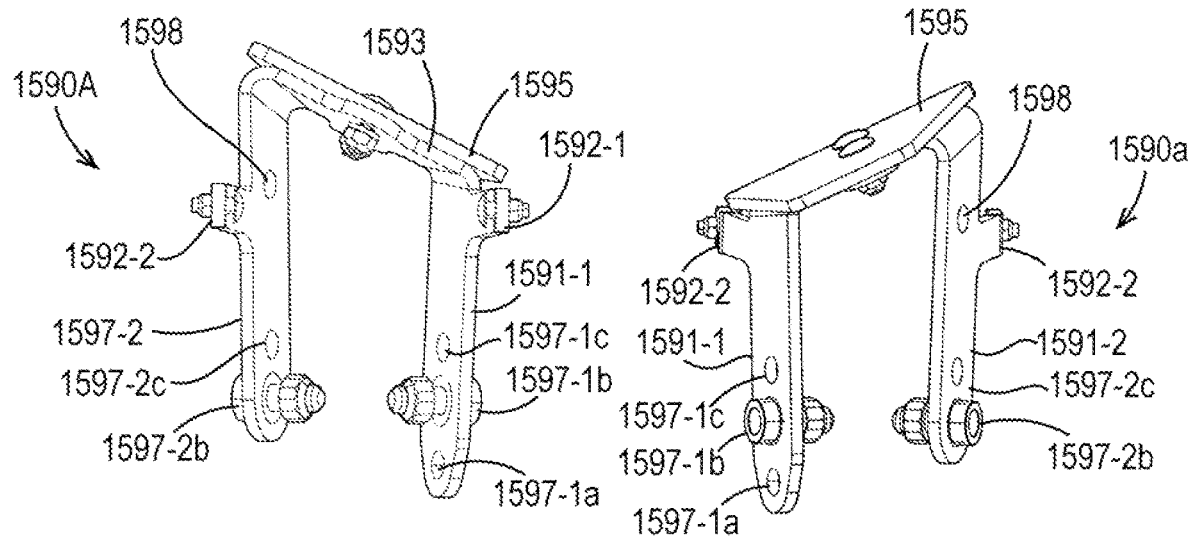
FIG. 49B is a top plan view of the guard of FIG. 49A.
FIG. 49C is a bottom plan view of the guard of FIG. 49A.
Figures 49D, 49E:
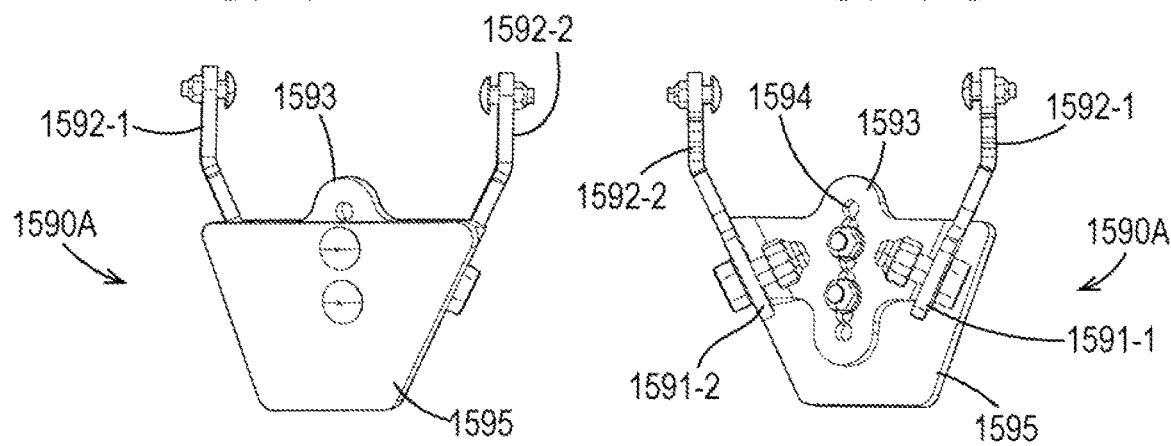
FIG. 49D is a front elevation view of the guard of FIG. 49A.
FIG. 49E is a rear elevation view of the guard of FIG. 49A.
Figure 49F:
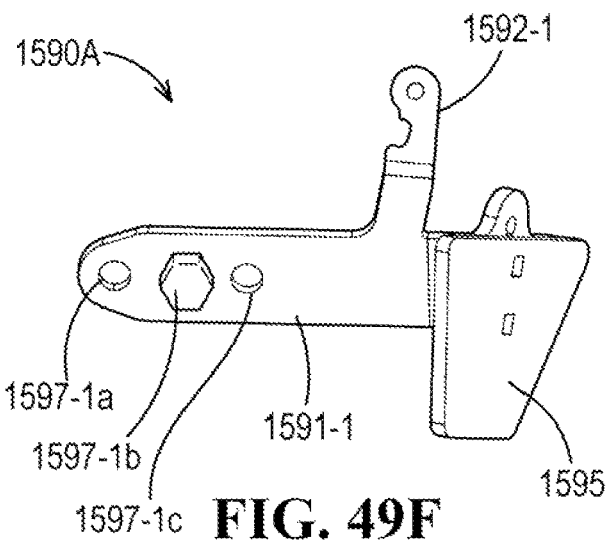
FIG. 49F. is right side elevation view of the guard of FIG. 49A.
Figure 49G:
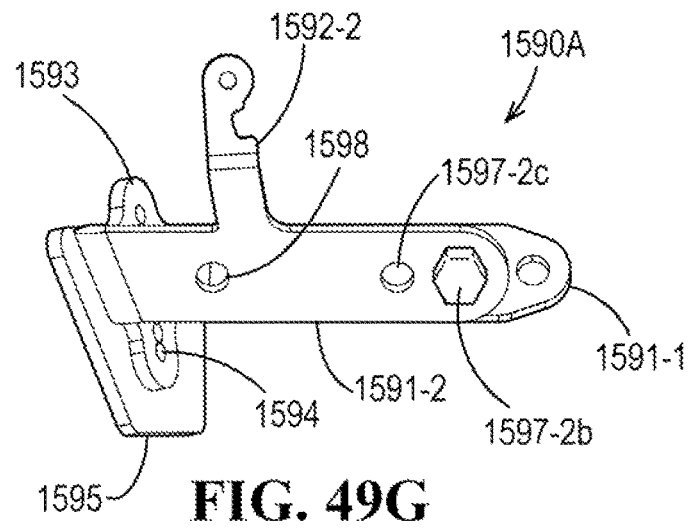
FIG. 49G. is left side elevation view of the guard of FIG. 49A.
Figure 49H:
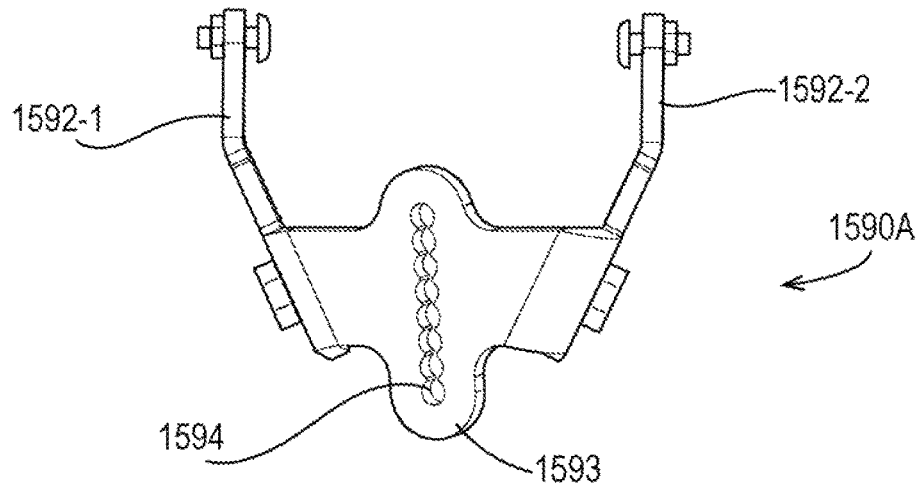
FIG. 49H is a front elevation view of the guard of FIG. 49D with the adjustable plate removed.

In an alternative embodiment as illustrated in FIG. 42 or FIG. 43, a nozzle 2300 (2300-2) can be connected to one or both soil deflectors 3100, 3500. Nozzle 2300 is connected to a fluid source (not shown). While illustrated with nozzle 2300 depositing fluid rearward of soil deflector 3100 or 3500 opposite the direction of travel, nozzle 2300 can be positioned to apply fluid towards the trench, or nozzle 2300 can be positioned to deposit fluid away from the trench.

FIGS. 44A-44E illustrate trench closing assembly 250E, which is similar to trench closing assembly 250D except that guard 1590 is replaced with guard 1590A, and press wheel 255D (255D-1, 255D-2) is shown with press wheel 1300' (1300'-1, 1300'-2) from U.S. Provisional Patent Application No. 62/843,037.

Scraper 4000 (4000-1, 4000-2) is illustrated in FIGS. 45A to 47B. Scraper 4000 (4000-1, 4000-2) connects to axel 257 (257-1, 257-2, respectively) and is shaped to extend towards closing wheel 254D (254D-1, 254D-2, respectively) and follows the contour of closing wheel 254D rearward opposite the direction of travel of closing system 250E and can terminate at an edge of closing wheel 254D or extend beyond the outer radius of closing wheel 254D. Optionally, a nozzle 4010 (4010-1, 4010-2) can be connected to scraper 4000 to apply fluid from a source (not shown). Scraper 4000 (4000-1, 4000-2) can be a unitary piece, or it can be fabricated from different pieces. Scraper 4000 (4000-1, 4000-2) can have different sections. Hub section 4001 (4001-1, 4001-2) is for connecting to axle 257 (257-1, 257-2, respectively). Section 4002 (4002-1, 4002-2) transitions from hub section 4001 (4001-1, 4001-2) to scraping section 4003 (4003-1, 4003-2, respectively). Scraping section 4003 (4003-1, 4003-2) follow the contour of closing wheel 254D (254D-1, 254D-2, respectively). Scraping section 4003 (4003-1, 4003-2) terminates at end 4004 (4004-1, 4004-2, respectively). Optional nozzle 4010 (4010-1, 4010-2) is connected to end 4004 (4004-1, 4004-2, respectively). While illustrated with this embodiment, scraper 4000 can be adapted to work with any closing wheel 254 (such as 254, 254D).

Guard 1590A is illustrated in FIGS. 48A to 49H. Guard 1590 is generally U-shaped having a front plate 1593 and arms 1591-1 and 1591-2 extending rearwardly opposite the direction of travel. Front plate 1593 and arms 1591-1, 1591-2 can be a unitary part or fabricated from individual parts. Front plate 1593 can be perpendicular to the direction of travel of closing system 250, or front plate 1593 can be disposed at an angle with respect to the direction of travel. Front plate 1593 has a slot 1594 for accepting a fastener (such as a bolt or screw) to adjustably attach adjustable plate 1595. Slot 1594 can be continuous (not shown) or can be a series of holes for specific positions for accepting the fastener. While shown with adjustable plate 1595, guard 1590 can replace the front plate 1593 with slot 1594 with plate 1595 in place of front plate 1593 for a fixed configuration (not shown). Arm 1591-1 can have one hole 1597-1 or a plurality of holes 1597-1 (1597-1a, 1597-1b, 1597-1c). One hole 1597-1 (such as 1597-1b) can be used for attaching guard 1590A to frame 1520 and closing wheel 254D-1. Closing wheel 254D-1 could optionally be attached at hole 1597-1a or 1597-1c for different configurations. Arm 1591-2 can have one hole 1597-2 or a plurality of holes 1597-2 (1597-2b, 1597-2c) and/or 1598. One hole 1597-2 (such as 1597-2b) can be used for attaching guard 1590A to frame 1520 and closing wheel 254D-2. Closing wheel 254D-2 could optionally be attached at hole 1597-2c or at hole 1598. Attaching closing wheel 254D-2 at hole 1598 allows for an offset of closing wheels 254D-1, 254D-2. In this configuration, the angle crated by front plate 1593 is such that the side of 1593 closest to closing wheel 254D-2 is disposed forward of the side of 1593 closest to closing wheel 254D-1. Arms 1592-1 and 1592-2 extend from arms 1591-1 and 1591-2, respectively, to connect guard 1590A to frame 1520 at connections 1596-1 and 1596-2, respectively. Arms 1591-1, 1591-2, 1592-1, 1592-2 can be designed to follow the contour of frame 1520. While illustrated as a separate part, guard 1590A could be formed as part of frame 1520.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art.

The invention claimed is:

1. A trench closing system for a row unit of an agricultural planter, the row unit having a row unit frame supporting an opener disk for opening a seed trench in a soil surface as the row unit travels in a forward direction of travel, the trench closing system comprising:
    a main frame supported by and extending rearwardly from the row unit frame;
    a frame member pivotally supported from the main frame;
    a pair of closing wheels comprising a first closing wheel and a second closing wheel each rotatably supported by the frame member with the first closing wheel disposed on a first side of the seed trench and the second closing wheel disposed on a second side of the seed trench, the pair of closing wheels cooperating with one another to close the opened seed trench with soil as the row unit travels in the forward direction of travel;
    a guard attached to or integral with the frame member at an underside of the frame member and ahead of the closing wheels, the guard comprising:
        a first arm disposed on a first side of the frame member;
        a second arm disposed on a second side of the frame member;
        a first support arm connected to the first arm and the first side of the frame member;
        a second support arm connected to the second arm and the second side of the frame member;
        a plate having a first side connected to the first arm and a second side connected to the second arm.

2. The trench closing system of claim 1, wherein the plate is perpendicular to the forward direction of travel.

3. The trench closing system of claim 1, wherein the plate is disposed at an angle with respect to the forward direction of travel.

4. The trench closing system of claim 1, further comprising an adjustable plate attached to the plate.

5. The trench closing system of claim 2, further comprising an adjustable plate attached to the plate.

6. The trench closing system of claim 3, further comprising an adjustable plate attached to the plate.

7. The trench closing system of claim 4, wherein the adjustable plate is adjustable to a plurality of vertical positions relative to the plate.

8. The trench closing system of claim 5, wherein the adjustable plate is adjustable to a plurality of vertical positions relative to the plate.

9. The trench closing system of claim 6, wherein the adjustable plate is adjustable to a plurality of vertical positions relative to the plate.

10. The trench closing system of claim 1, wherein the first arm and the second arm each have a plurality of holes for mounting the closing wheels in different positions.

11. The trench closing system of claim 2, wherein the first arm and the second arm each have a plurality of holes for mounting the closing wheels in different positions.

12. The trench closing system of claim 3, wherein the first arm and the second arm each have a plurality of holes for mounting the closing wheels in different positions.

13. The trench closing system of claim 4, wherein the first arm and the second arm each have a plurality of holes for mounting the closing wheels in different positions.

14. The trench closing system of claim 7, wherein the first arm and the second arm each have a plurality of holes for mounting the closing wheels in different positions.

15. The trench closing system of claim 10, wherein the second closing wheel is disposed forward of the first closing wheel along the forward direction of travel, and the plate is disposed at the angle with the second side of the plate being forward of the first side of the plate along the forward direction of travel.

16. The trench closing system of claim 11, wherein the second closing wheel is disposed forward of the first closing wheel along the forward direction of travel, and the plate is disposed at the angle with the second side of the plate being forward of the first side of the plate along the forward direction of travel.

17. The trench closing system of claim 12, wherein the second closing wheel is disposed forward of the first closing wheel along the forward direction of travel, and the plate is disposed at the angle with the second side of the plate being forward of the first side of the plate along the forward direction of travel.

18. The trench closing system of claim 13, wherein the second closing wheel is disposed forward of the first closing wheel along the forward direction of travel, and the plate is disposed at the angle with the second side of the plate being forward of the first side of the plate along the forward direction of travel.

19. The trench closing system of claim 14, wherein the second closing wheel is disposed forward of the first closing wheel along the forward direction of travel, and the plate is disposed at the angle with the second side of the plate being forward of the first side of the plate along the forward direction of travel.

* * * * *